(12) United States Patent
Lull et al.

(10) Patent No.: US 10,571,349 B2
(45) Date of Patent: *Feb. 25, 2020

(54) APPARATUS, SYSTEM AND METHOD FOR POWER MEASUREMENT AT A CRANK AXLE AND CRANK ARM

(71) Applicant: Foundation Fitness, LLC, Portland, OR (US)

(72) Inventors: Andrew P. Lull, Boulder, CO (US); Patrick A. Warner, Boulder, CO (US)

(73) Assignee: Foundation Fitness, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,520

(22) Filed: Mar. 19, 2018

(65) Prior Publication Data

US 2018/0209862 A1 Jul. 26, 2018

Related U.S. Application Data

(63) Continuation-in-part of application No. 15/232,631, filed on Aug. 9, 2016, now Pat. No. 10,076,681, and a continuation of application No. 14/011,297, filed on Aug. 27, 2013, now Pat. No. 9,921,118, said application No. 15/232,631 is a continuation of
(Continued)

(51) Int. Cl.
*G01L 3/00* (2006.01)
*G01L 3/24* (2006.01)
*A63B 24/00* (2006.01)
*A63B 22/06* (2006.01)

(52) U.S. Cl.
CPC .......... *G01L 3/242* (2013.01); *A63B 24/0087* (2013.01); *A63B 2022/0611* (2013.01); *A63B 2220/54* (2013.01); *A63B 2220/833* (2013.01); *A63B 2225/50* (2013.01)

(58) Field of Classification Search
CPC ........ A63B 24/0087; A63B 2022/0611; A63B 2220/54; A63B 2220/833; A63B 2225/50; G01L 3/242
USPC ..................................... 73/972.338, 862.338
See application file for complete search history.

(56) References Cited

U.S. PATENT DOCUMENTS 8,651,993 B1 * 2/2014 Watarai .................... B62M 6/55
475/205
9,921,118 B2 * 3/2018 Lull .................. A63B 24/0087
(Continued)

*Primary Examiner* — Max H Noori
(74) *Attorney, Agent, or Firm* — Polsinelli P.C.

(57) ABSTRACT

A power measurement assembly mounted within an axle. In a specific example, the axle is a spindle that is interconnects the cranks of a bicycle, exercise, bicycle, or other fitness equipment. The power measurement assembly may include strain gauges connected with an appropriate circuit (e.g., Wheatstone bridge) that provides an output of the force on the axle by a rider pedaling the crank. In the case of an axle, the strain gauges measure the torsion due to the applied torque on the crank. The value is converted to a power value by a processor and that value is then wirelessly transmitted for display. The processor and/or the transmitter may be mounted within the axle. A separate power measurement assembly may be mounted on one of the cranks, which may include its own processor and transmitter or may take advantage of the processor and transmitter within the axle.

24 Claims, 24 Drawing Sheets

Related U.S. Application Data application No. 13/356,487, filed on Jan. 23, 2012, now Pat. No. 9,417,144.

(60) Provisional application No. 61/693,967, filed on Aug. 28, 2012, provisional application No. 61/435,207, filed on Jan. 21, 2011.

(56) References Cited

U.S. PATENT DOCUMENTS

| | | | |
|---|---|---|---|
| 2010/0155167 A1* | 6/2010 | Pesenti | B62M 6/20 180/205.4 |
| 2012/0316035 A1* | 12/2012 | Andreasen | A61H 1/0214 482/7 |
| 2014/0200835 A1* | 7/2014 | Carrasco Vergara | G01L 3/00 702/42 |
| 2016/0216169 A1* | 7/2016 | Tetsuka | G01L 5/161 |
| 2017/0050702 A1* | 2/2017 | Grassi | B62M 25/08 |

* cited by examiner

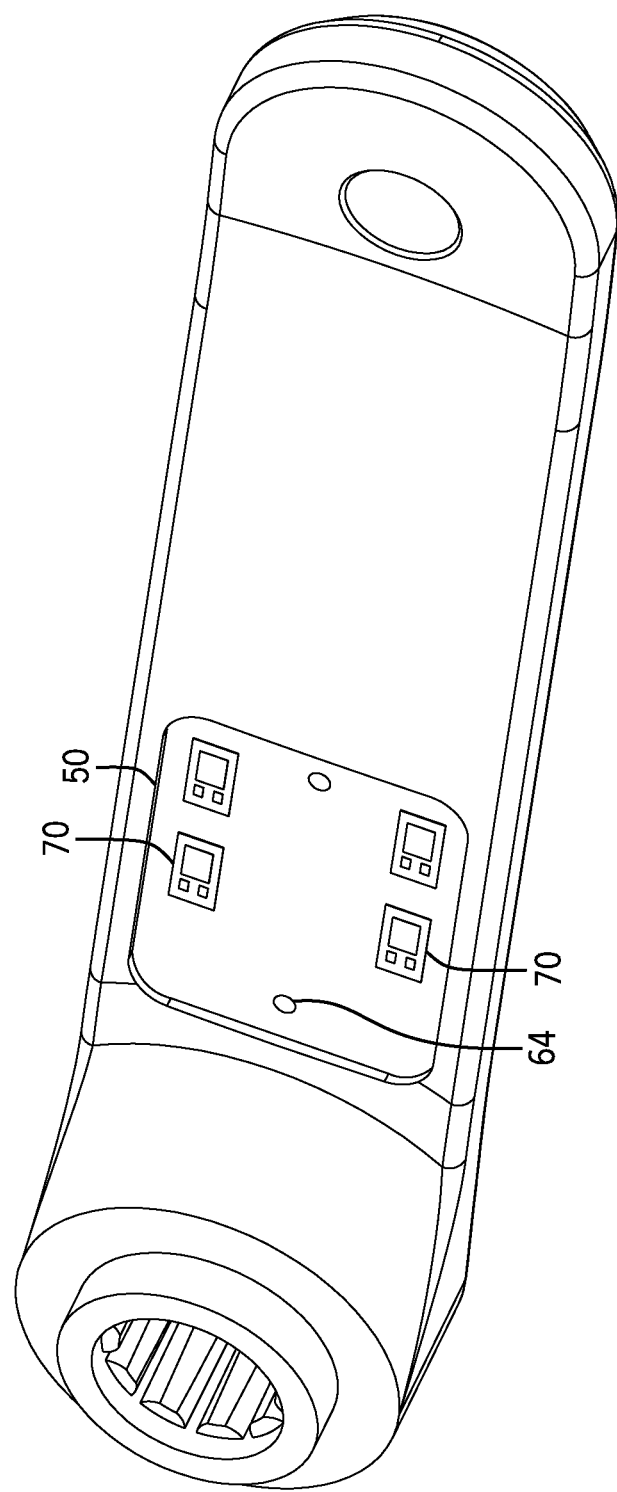

APPARATUS, SYSTEM AND METHOD FOR POWER MEASUREMENT AT A CRANK AXLE AND CRANK ARM

CROSS-REFERENCE TO RELATED APPLICATIONS

The present application is a continuation of co-pending U.S. patent application Ser. No. 14/011,297 titled "Apparatus, System and Method for Power Measurement at a Crank Axle and Crank Arm" and filed Aug. 27, 2013, which claims priority under 35 U.S.C. § 119 to provisional application No. 61/693,967 titled "Apparatus, System and Method for Power Measurement at a Crank Axle and Crank Arm," filed Aug. 28, 2012, which are hereby incorporated by reference herein. The present application is also related to and is a continuation-in-part of co-pending application Ser. No. 15/232,631 titled "Apparatus, System and Method for Power Measurement," filed on Aug. 9, 2016, which is a continuation of Ser. No. 13/356,487 titled "Apparatus, System and Method for Power Measurement," filed on Jan. 23, 2012, now U.S. Pat. No. 9,417,144, which claims priority under 35 U.S.C. § 119 to provisional application No. 61/435,207 "Apparatus, System and Method for Power Measurement," filed on Jan. 21, 2011, which are hereby incorporated by reference herein.

TECHNICAL FIELD

Aspects of the present disclosure involve a power measurement device and methods for calculating power for use with a crank assembly of a bicycle, exercise bicycle or other exercise and fitness equipment.

BACKGROUND

Fitness training using a power meter, particularly for bicyclists, is increasing popular. Power meters measure and display the rider's power output, typically displayed in Watts, used for pedaling. Power meters of many different sorts have been adapted for use on bicycles, exercise bicycles and other fitness equipment. Many of these designs are overly complicated, prone to error, and/or prone to failure, and also tend to be relatively expensive. As such, many health clubs have yet to add power meters to their indoor cycling and exercise bikes, and many riders find the expense of adding power to their road or mountain bike prohibitive.

Often such clubs and riders use heart rate monitors for training and to provide feedback for a rider, rather than using power meters. These devices also may provide information concerning speed, distance traveled, and calories, but that information cannot include or be based upon power measurements and thus may not be as accurate as values derived from power measuring heart rate. While providing useful information for measuring performance, is not as good as measuring power in providing consistent and useful information to the rider. For example, when rapidly accelerating or sprinting, heart rate lags behind the rider's effort whereas power provides a nearly instantaneous reflection of the rider's effort. When a rider is dehydrated, malnourished, tired, sick, injured, or otherwise not in optimal riding condition, the rider may conduct a workout at a typical heart rate but their power at that heart rate may be considerably less than typical. Thus, the rider can identify and possibly rectify the cause of the non-optimal condition. Finally, measuring and comparing power over an extended period of training, can help a rider identify training that helps increase power and those that do not and thereby continually refine and improve their training regimen.

With these thoughts in mind, among others, aspects of the power meter and related power measurement techniques of the present disclosure were conceived.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 14 is an isometric view of the inside of the crank arm particularly illustrating a recess, which may be machined or directly molded into the crank arm, within which are four resistive reed switches that provide a fluctuation in resistance proportional to the force applied on a pedal connected to the crank;

DETAILED DESCRIPTION

Figure 1:
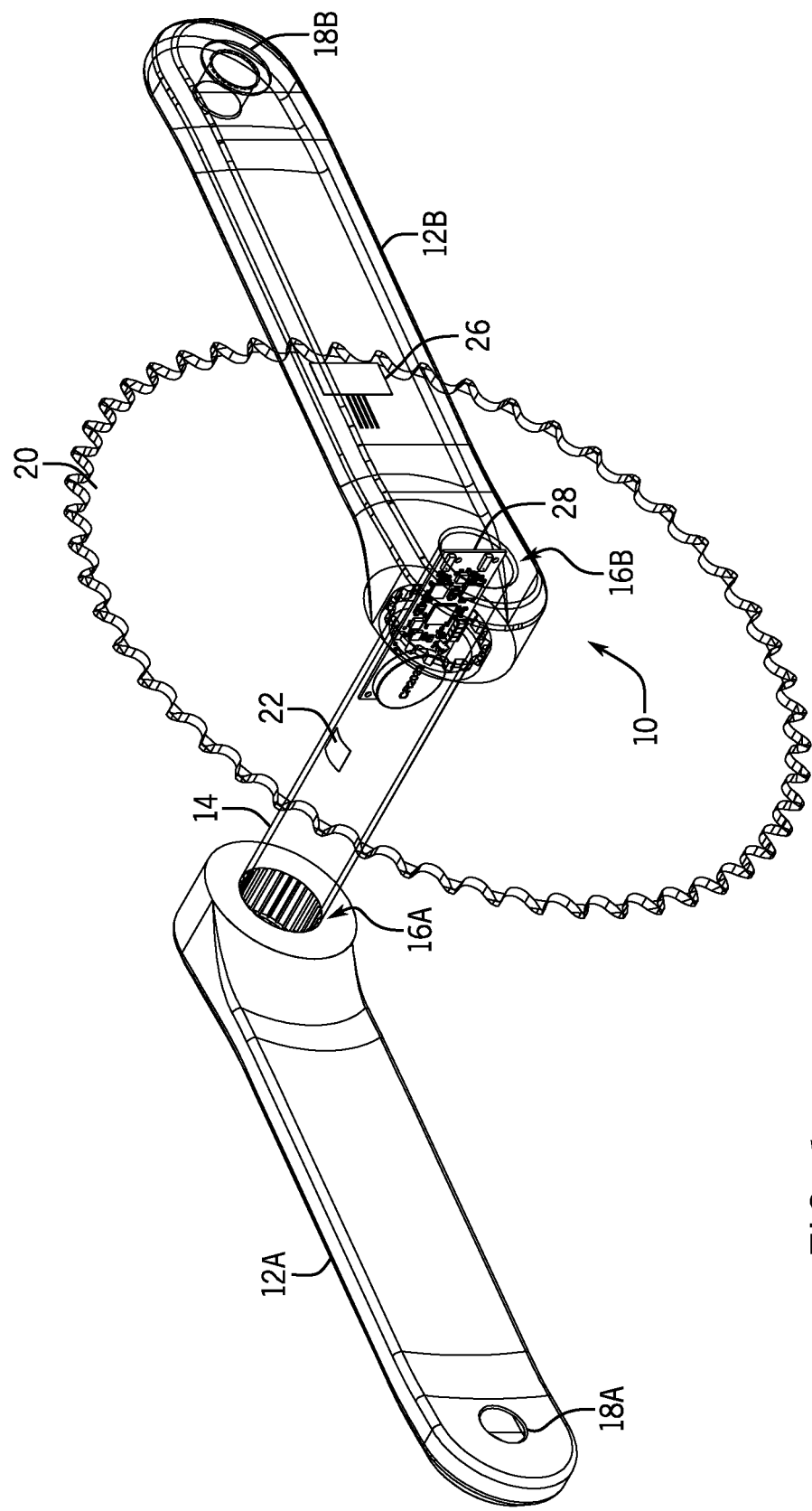
FIG. 1 is an isometric view of a crank assembly including a pair of crank arms interconnected by a crank axle with a first strain gauge and circuitry mounted within the axle and a second strain gauge mounted on a crank arm such that torque from both crank arms may be measured and converted into a power crank arm specific power measurement.
Figure 2:
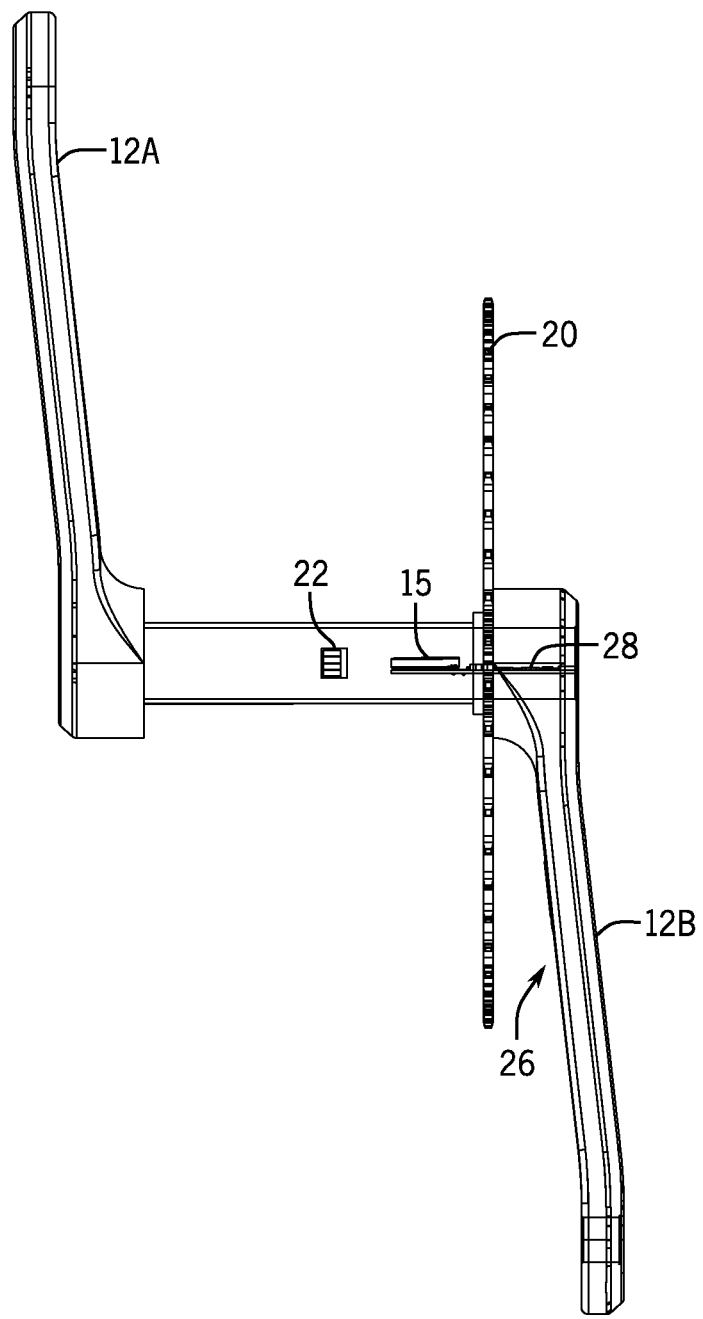
FIG. 2 is a bottom view of the crank assembly and power measurement apparatus shown in FIG. 1.
Figure 3:
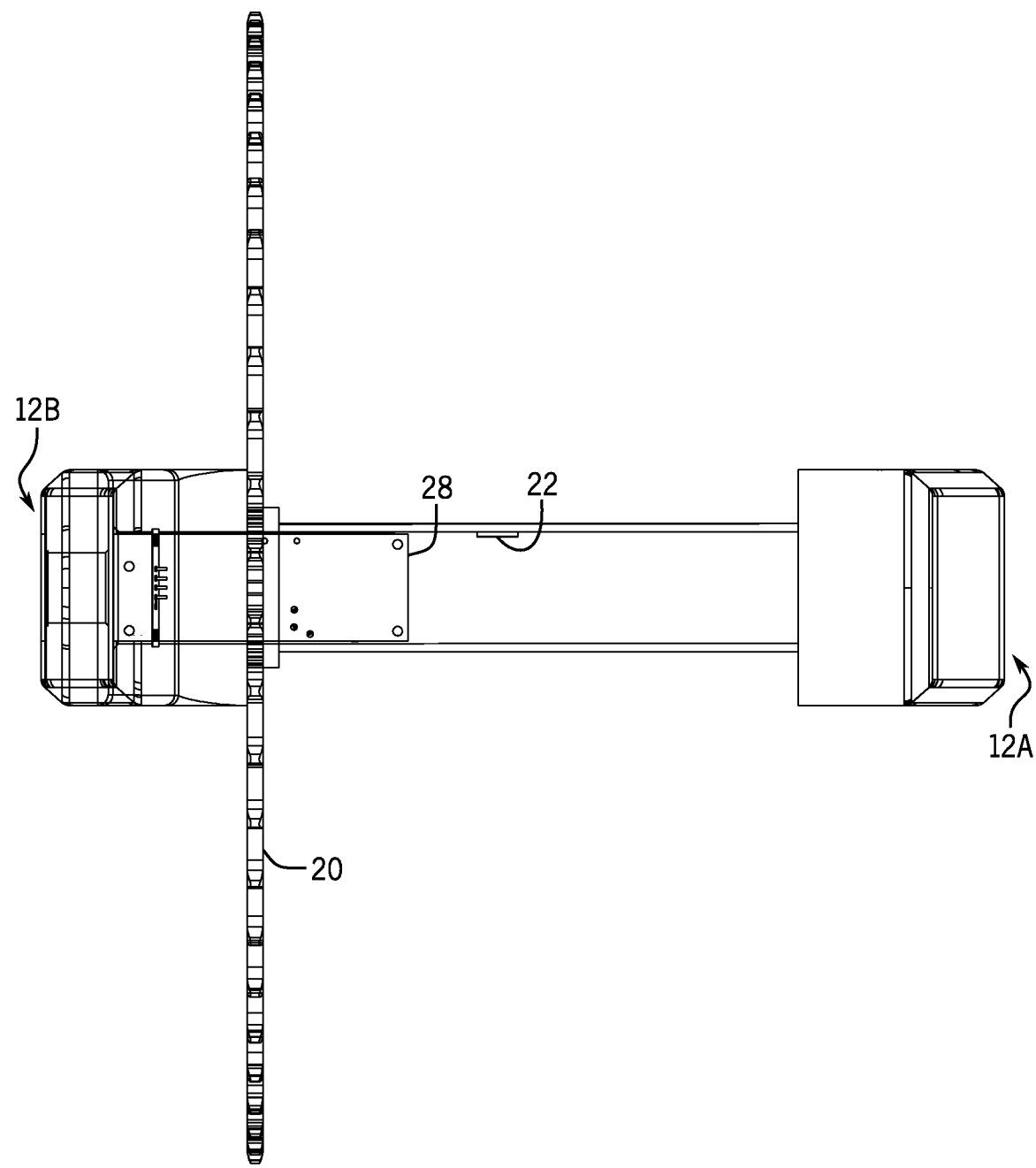
FIG. 3 is a rear view of the crank assembly and power measurement apparatus shown in FIG. 1.
Figure 4:
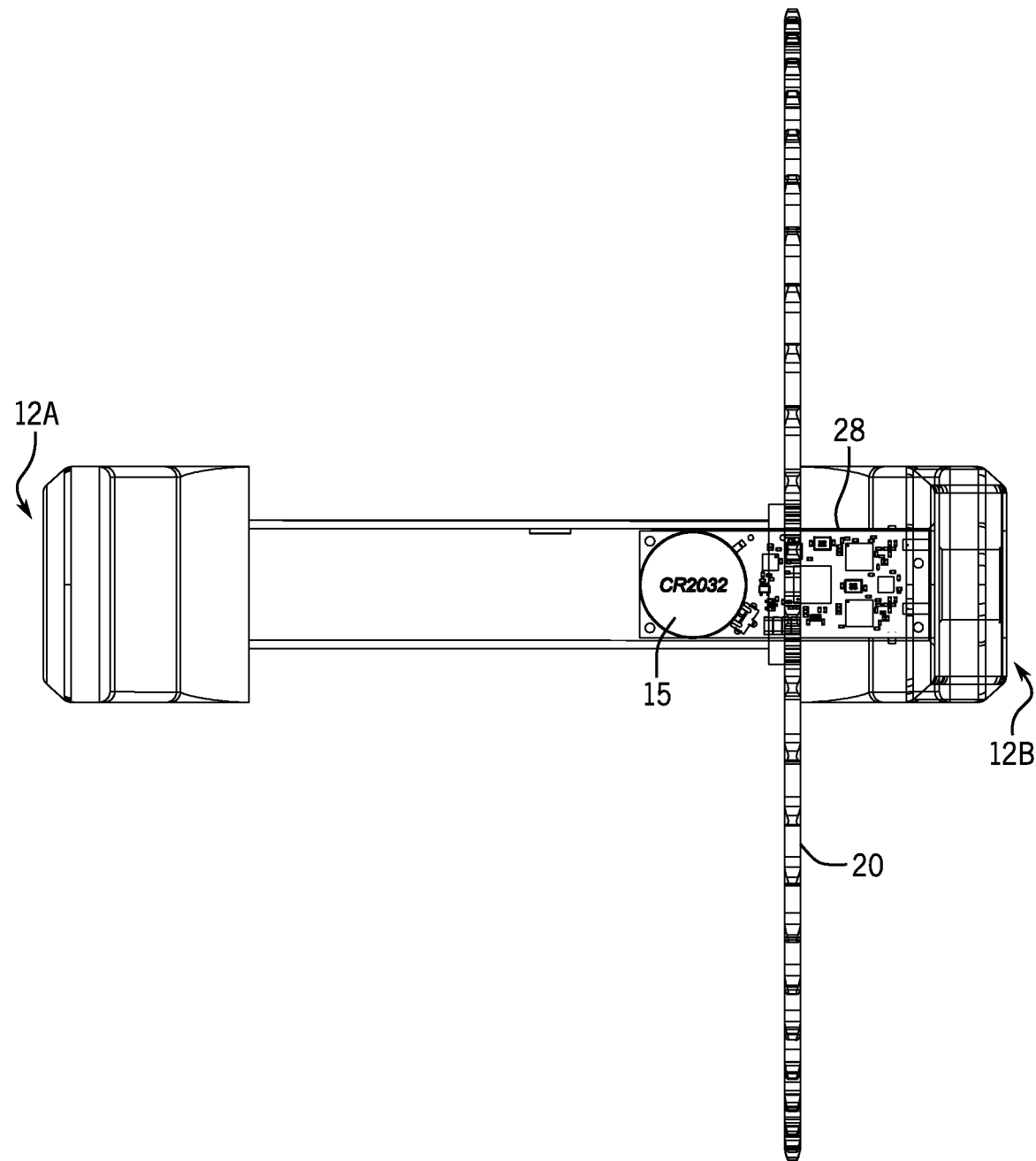
FIG. 4 is a front view of the crank assembly and power measurement apparatus shown in FIG. 1.
Figure 5:
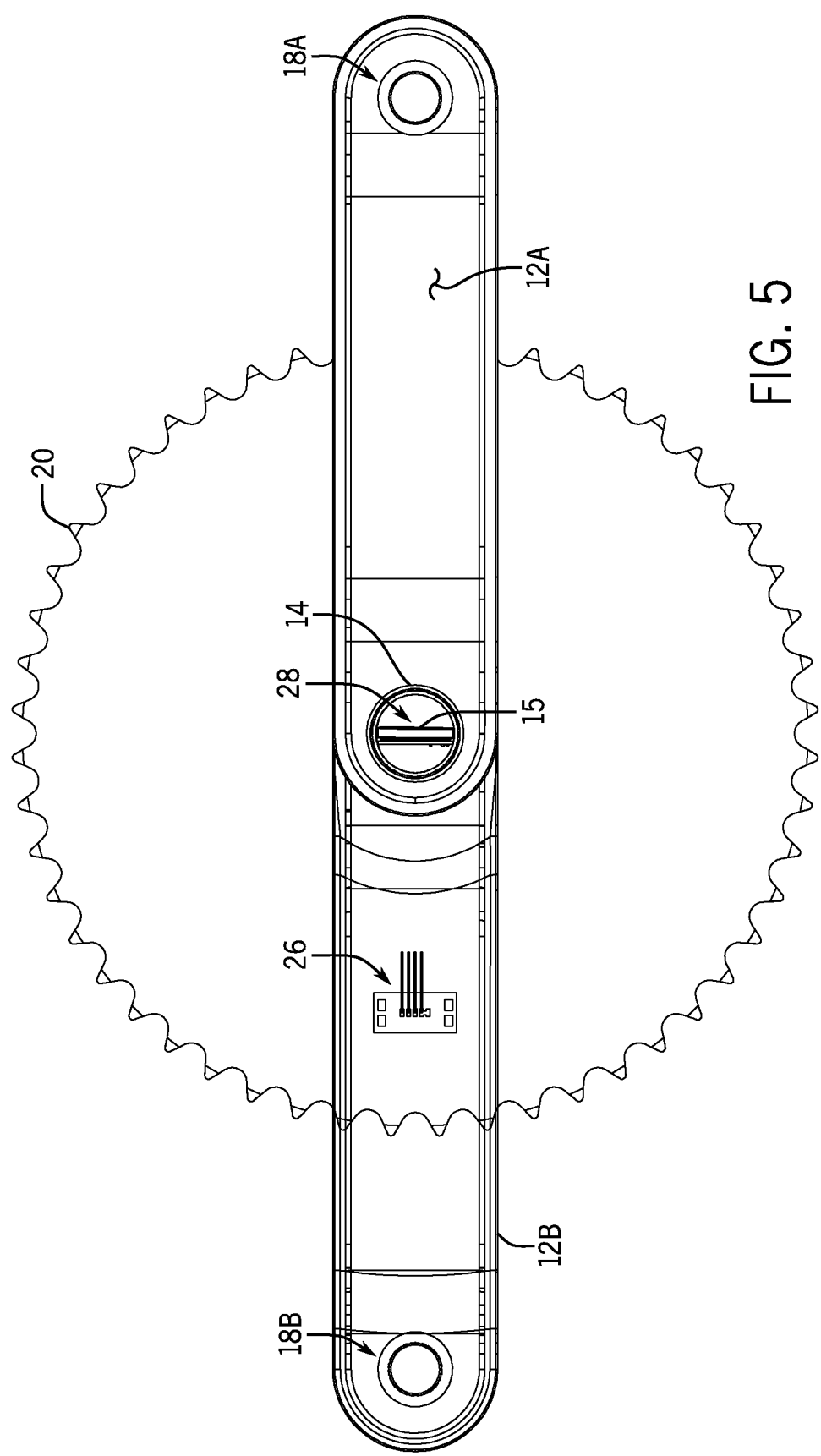
FIG. 5 is a left side view of the crank assembly and power measurement apparatus shown in FIG. 1.
Figure 6:
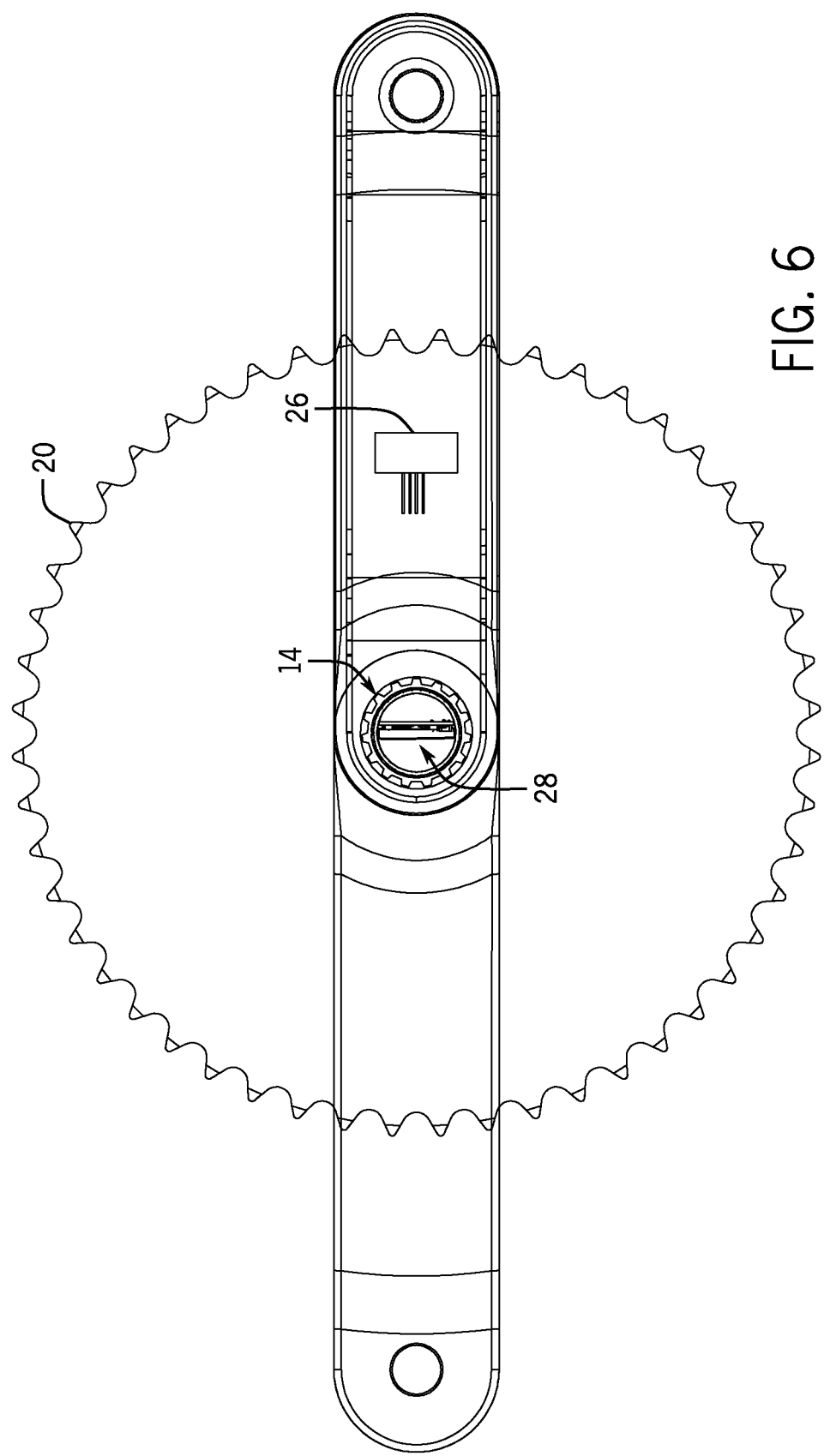
FIG. 6 is a right side view of the crank assembly and power measurement apparatus shown in FIG. 1.
Figure 7:
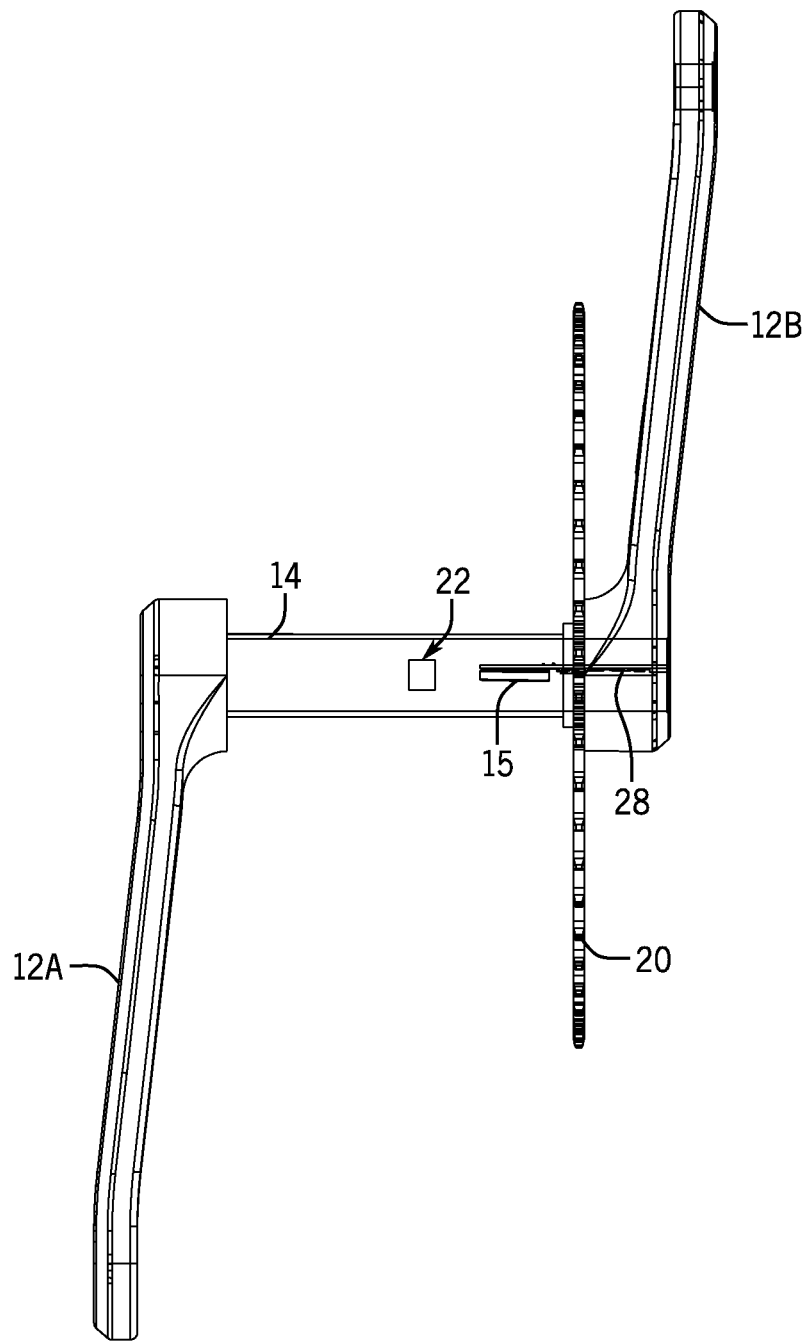
FIG. 7 is a top view of the crank assembly and power measurement apparatus shown in FIG. 1.

Aspects of the present disclosure involve a power measurement assembly mounted within a hollow axle, or spindle, interconnecting a pair of crank arms. The crank assembly may be part of an exercise bicycle, indoor cycling bicycle, bicycle, or other form of mobile device or exercise equipment using a crank assembly. A strain gauge is mounted on an inner wall of the axle and configured to measure the torque applied to the axle. The torque is representative of the torque applied to the crank arms. Overall, a rider's total power output may be approximated by doubling the power derived from the torque measurement taken from the axle. Aspects of the present disclosure may, however, further involve a second power measurement device or assembly mounted on a crank arm adjacent a drive sprocket. In this example, the rider may obtain power measurements for each leg (derived from the torque applied to each crank). The device also produces a total power output by adding the two power values derived from the torque on the axle (representative of the crank arm opposite the sprocket) and the torque on the opposing crank arm adjacent the sprocket.

In one particular implementation, each of the components that measure power, calculate power, and transmit the power calculation to a display, are mounted within the axle. Alternatively, those components may be mounted on the crank arm. In one particular implementation, the display wirelessly receives power data and displays power values. The display may be mounted anywhere desirable, such as on a handlebar. The display may also be incorporated in a wrist watch or cycling computer. Finally, the power data may be transmitted to other devices, such as a smart phone, tablet, lap top or other computing device for real-time display and/or storage.

More specifically and referring to FIGS. 1-7, a crank assembly 10 conforming with aspects of the present disclosure includes a pair of opposing crank arms (12A, 12B) interconnected by a hollow or substantially hollow axle 14, also referred to as a "spindle." The axle is interconnected with each crank at corresponding apertures (16A, 10B) defined in the respective crank arms. A pedal aperture (18A, 18B) that receives various possible styles of pedal is defined at an opposite end of the crank. With respect to the left crank 12A, the inside of the aperture and the outer surface of the end of the axle may define matching ridges such that the crank arm will not rotate relative to the axle when force is applied. The opposite, right, crank arm 12B is mounted to the axle similarly. However, the right crank arm may define a circumferential flange around the axle to which a drive sprocket 20 is mounted. The drive sprocket carries a chain or belt that drives a rear wheel (in a conventional bicycle), a flywheel (in an indoor cycling bike) or otherwise. While one sprocket is shown, additional sprockets may also be included. Additionally, the sprocket or sprockets (also referred to as chain rings) may be coupled with the axle or crank in different ways.

Figure 8:
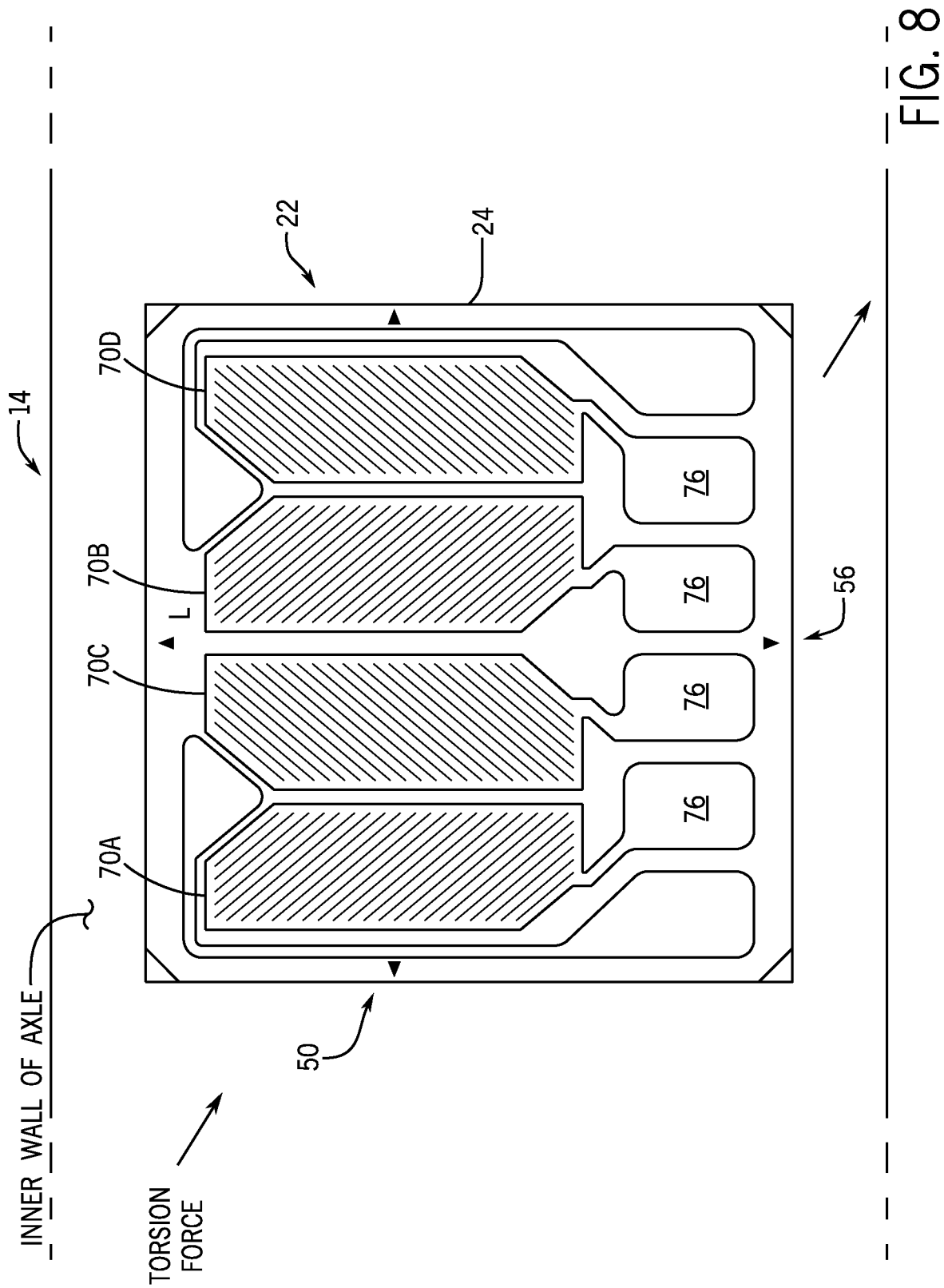
FIG. 8 is a front view of a strain gauge assembly in the form of four distinct strain gauges (conductor) in two pairs offset about 90 degrees, and with the strain gauges mounted on a flexible foil that is adhered to an inner wall of the axle such that the torsion force (arrows) is aligned with the conductors of one of the pair of gauges and arranged about 90 degrees to the opposing pair of the gauge conductors.

As introduced above, the axle 14 may be hollow and thus defines a tube with an inner wall. A strain gauge assembly 22 is mounted on the inner wall. FIG. 8 is one example of a printed circuit board 24 having two sets of two strain gauges. In this example, the first set includes strain gauges 70A and 70B and the second set includes strain gauges 70C and 70D. As shown, the first set of strain gauges are set at angle and the second set of gauges are rotated about 90 degrees relative to the first set. When the PCB is mounted on inner wall of the axle, as shown in FIG. 8, the torsional forces translated through the axle align with either the first set of gauges or the second set of gauges. While a strain gauge assembly with two pair of strain gauges (gauge conductors) is illustrated herein, it is possible to use two gauges or even only one gauge. The arrangement shown, however, provides more efficient temperature compensation and other benefits relative to other options. Should more or less gauges be used, then other circuit topologies besides a full Wheatstone bridge may be used such as a quarter bridge, a half bridge, and for particularly low resistance changes, a Kelvin bridge, as well as others.

Figure 9:
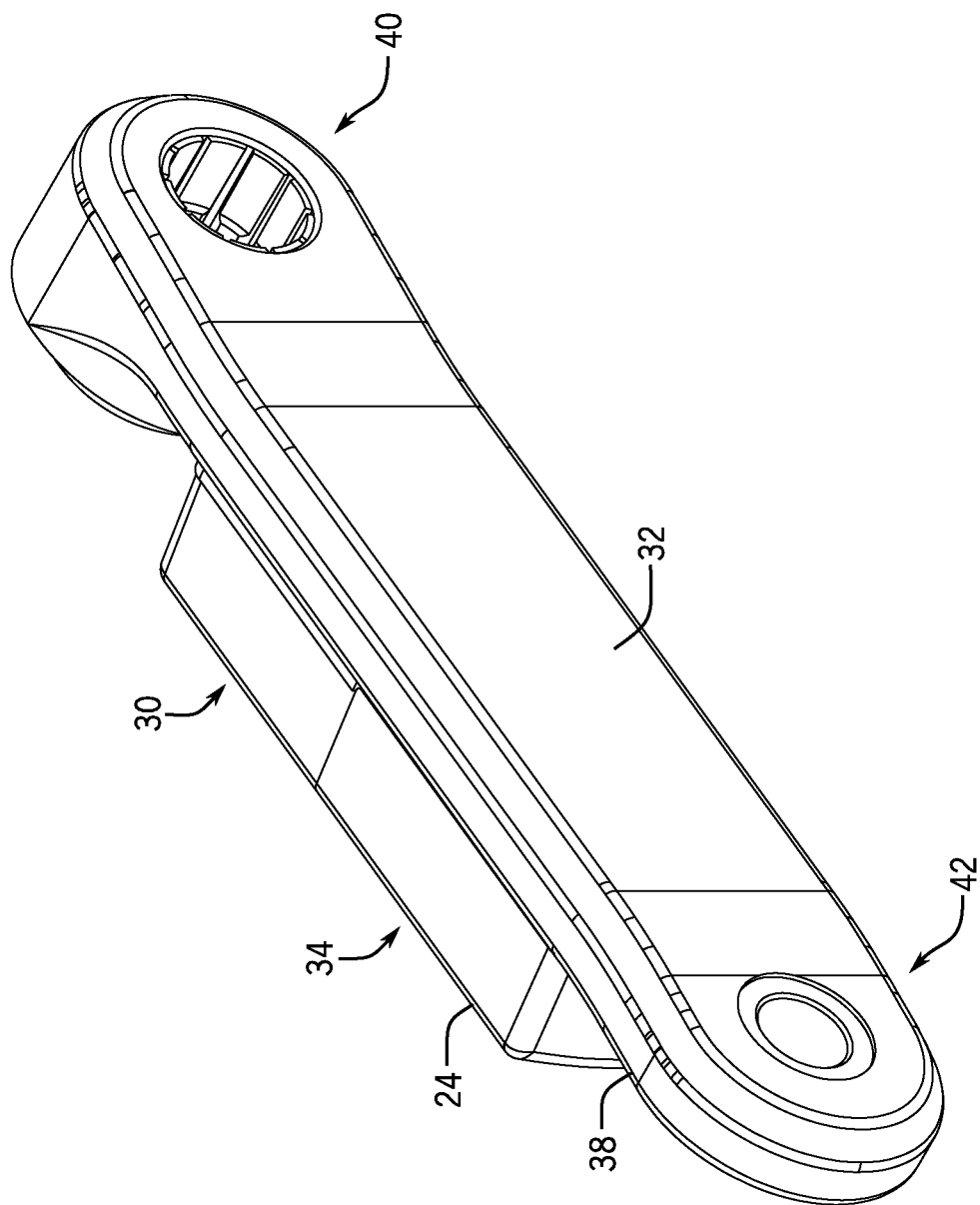
FIG. 9 is an isometric view of a crank arm with a power measurement apparatus connected thereto.
Figure 10:
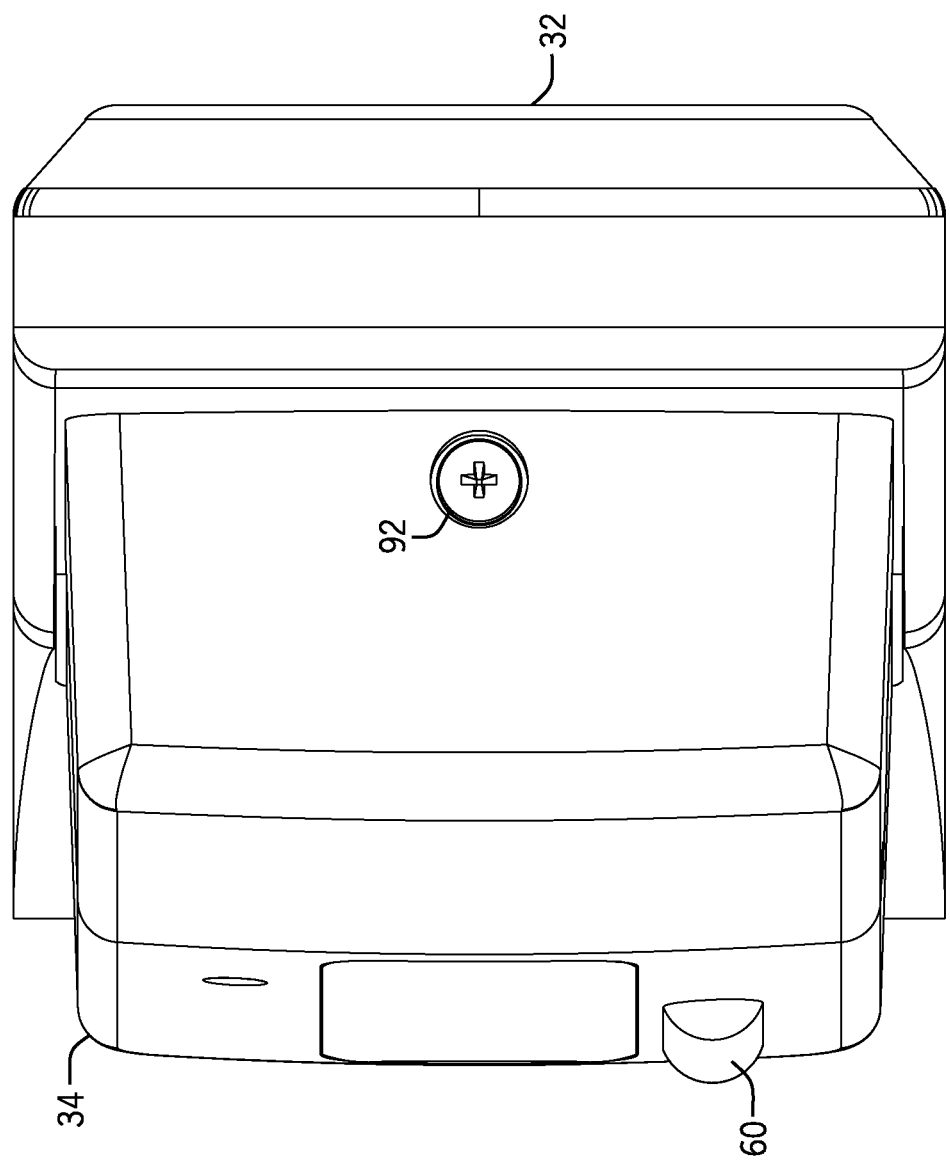
FIG. 10 is a front view of the crank arm and power measurement apparatus shown in FIG. 9.
Figure 11:
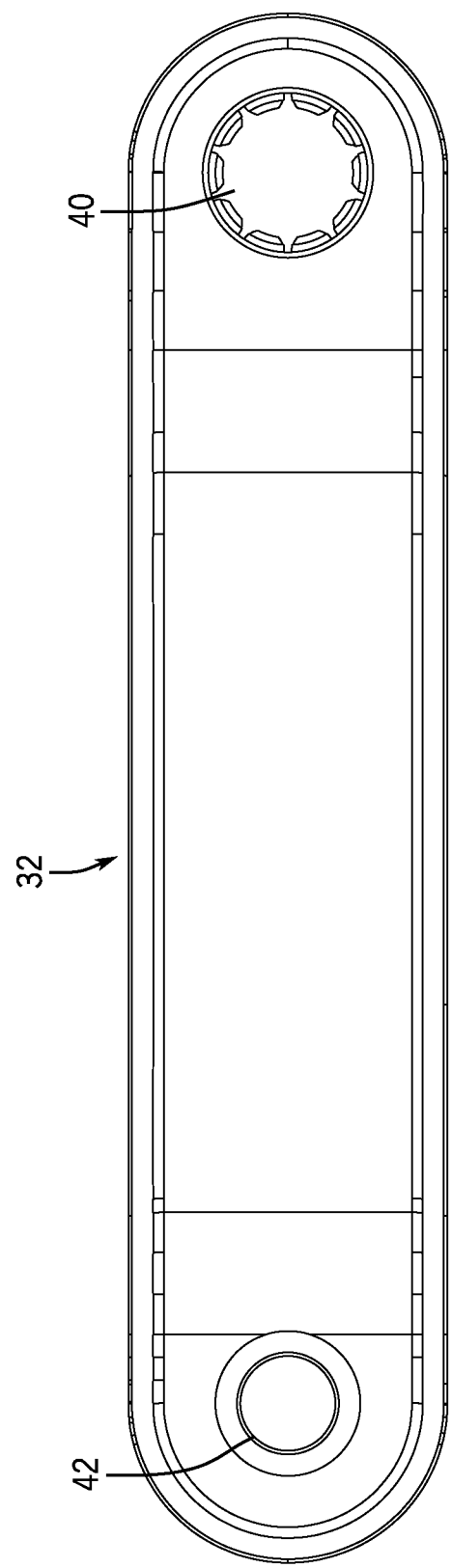
FIG. 11 is a left side view of the crank arm shown in FIG. 9, and particularly showing the outside of the crank arm from which a pedal would extend.
Figure 12A:
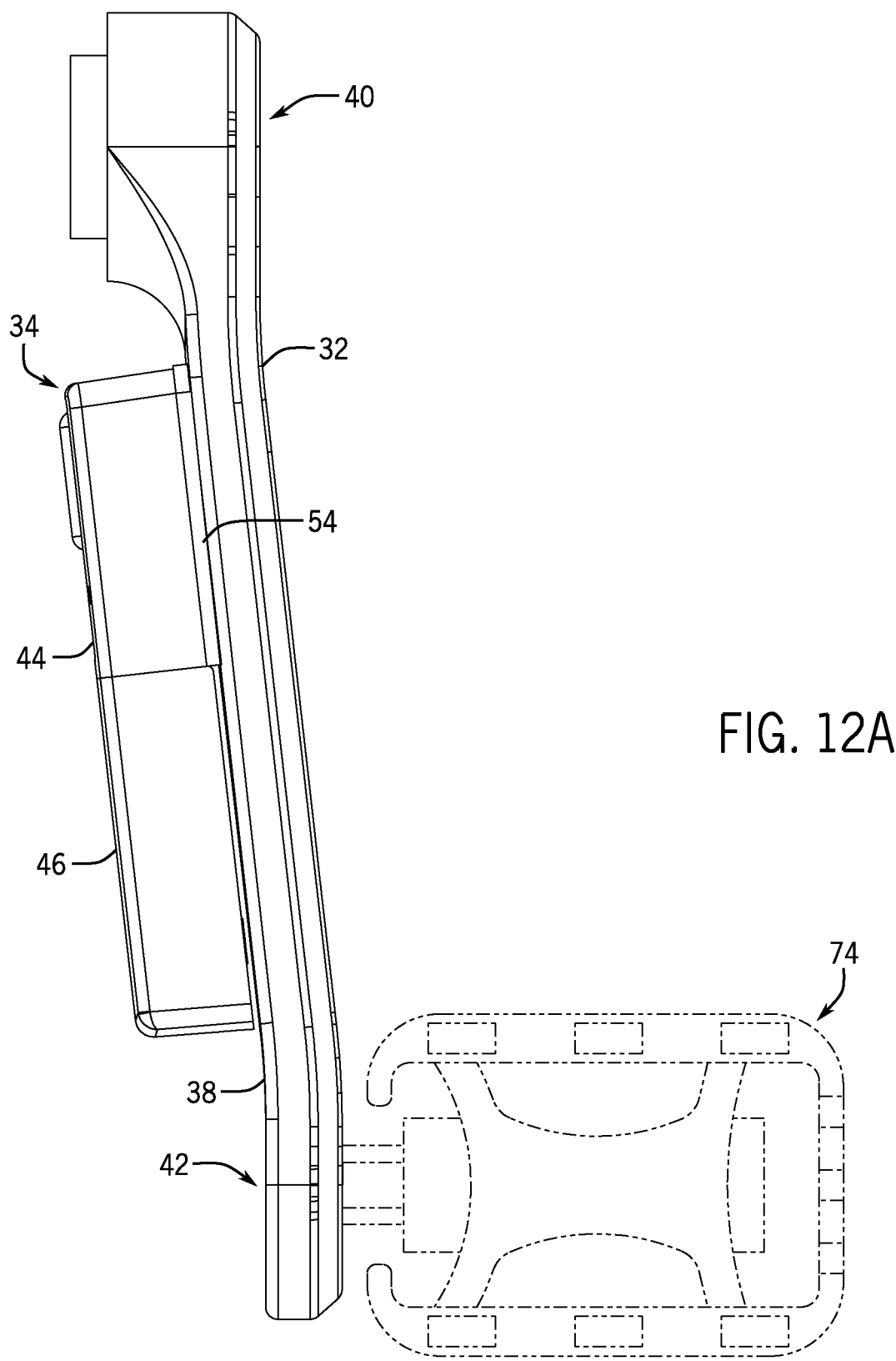
FIG. 12A is a top view of the crank arm and power measurement apparatus shown in FIG. 9.
Figure 12B:
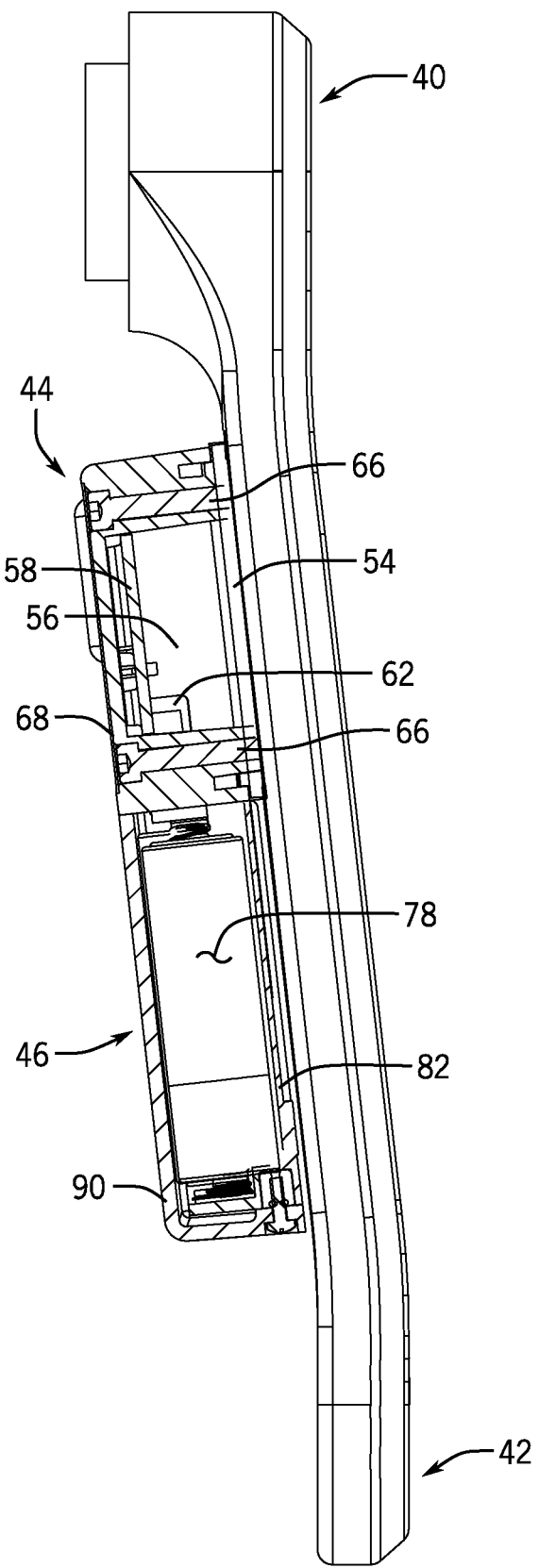
FIG. 12B is a top view of the crank arm and power measurement apparatus shown in FIG. 9, with some components of the power measurement apparatus hidden to illustrate internal components.
Figure 13A:
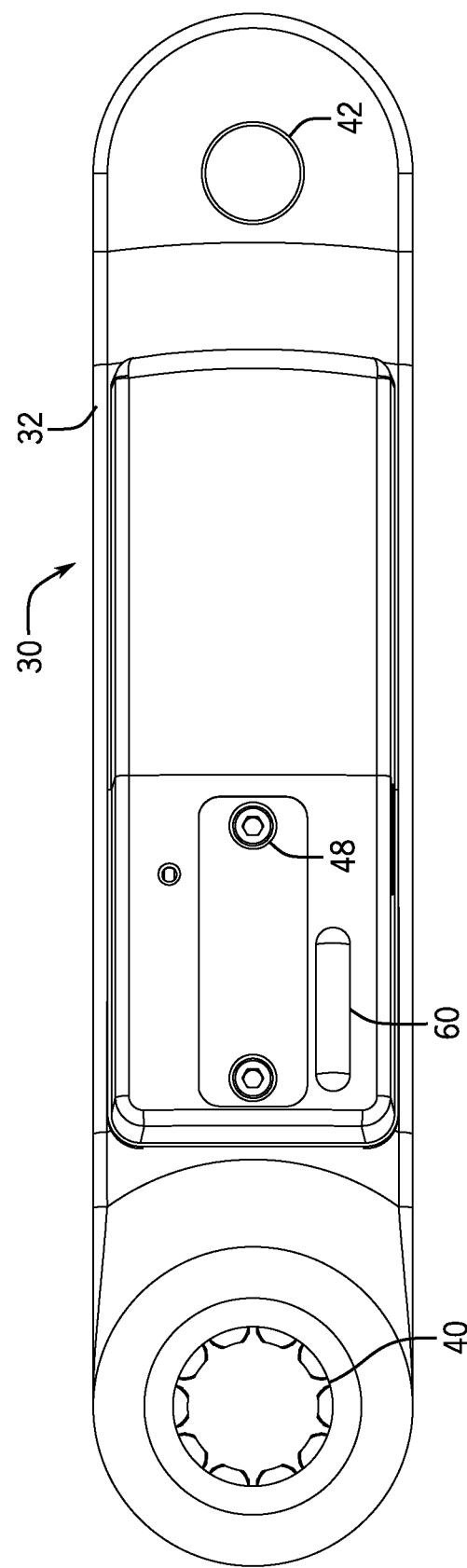
FIG. 13A is a right side view of the crank arm and power measurement apparatus shown in FIG. 9, and particularly illustrated the inside of the crank arm to which the power measurement apparatus is connected.
Figure 13B:
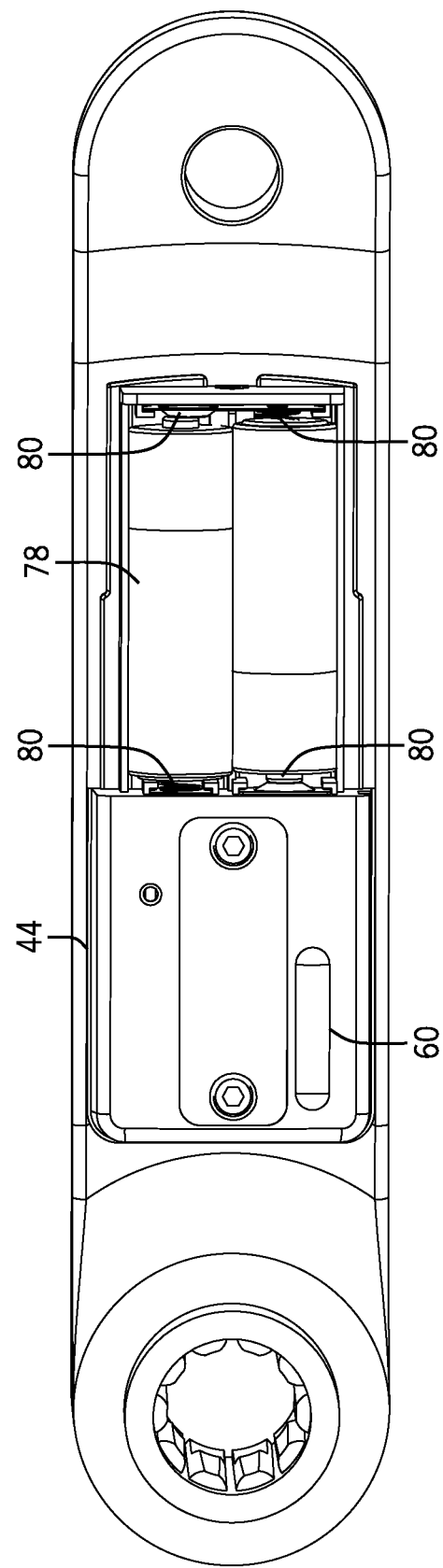
FIG. 13B is a right side view of the crank arm and power measurement apparatus shown in FIG. 9, and particularly illustrated the inside of the crank arm to which the power measurement apparatus is connected, with some components of the power measurement apparatus hidden to illustrate internal components.

As shown in FIGS. 8 and 9, the strain gauges 70 each include leads 76 connected in a Wheatstone bridge circuit arrangement. For example, as shown in FIG. 9, the strain gauges are connected in the circuit arrangement shown. Other circuit arrangements that use more or less strain gauges are possible, such as a half bridge configuration. An input current is applied to the bridge circuit and the output voltage of the circuit is proportional to the torsional force (torque) applied to the crank axle by the rider pedaling the left crank arm (in the example shown), as the strain gauges change resistance as they are placed in tension or compression. Referring to FIG. 8, when a torsional force is applied in the direction of the arrow, strain gauges 70A and 70B are placed in tension and the resultant resistance change is converted to an output voltage related to the torque. The output voltage may be applied to some form of conditioning and amplification circuitry, such as a differential amplifier and filter that will provide an output voltage to the processor. It is further possible to use an analog to digital converter to convert and condition the signal. As mentioned above, the printed circuit board supporting the Wheatstone bridge, the processor, conditioning, amplification, wireless transmitter, etc., is supported within the axle. Thus, leads, also within the axle, from the strain gauge PCB may extend to the main PCB. Either a torque value that needs to be converted to power, or power values are wirelessly transmitted from the transmitter.

With strain gauges mounted within the axle, it is possible to measure the power associated with one crank. To estimate the total power, the single measured value may be doubled. In such an arrangement, relative symmetry between the right and left leg of a given rider is assumed and the average power calculated from the power measurement device within the spindle is doubled and transmitted to the display processor (or doubled at the display processor). Alternatively, the crank assembly may include a second power measurement device associated with the opposing crank. In the example of FIG. 1, the power delivered by the rider to the left crank 12A is measured within the crank axle 14 whereas the power delivered by the rider to the right 12B, opposing, crank is measured by a set of separate strain gauges 26 mounted on the right crank or some other component associated with the right crank. Generally speaking, strain gauges are mounted on the right crank and the leads are connected to a Wheatstone bridge circuit to generate an output voltage indicative of torque. The Wheatstone bridge and other processing components may be located on a PCB 28 within the axle 14. In such an arrangement, leads from the strain gauge mounted on the pedal extend into the axle and are connected with a separate Wheatstone bridge. Alternatively, and as discussed hereafter, separate electronics may be mounted on the crank along with the strain gauges.

More particularly and referring to FIGS. 9-20 among others, in the example implementation shown herein, a power measurement device 30 is mounted on a crank arm 32. The crank arm 32 shown is particularly suited for an indoor cycling (IC) bicycle; however, the crank arm may be used on other forms of exercise bicycles, whether upright, recumbent, or otherwise, may be used with bicycles, may be used with other forms of fitness equipment that employ a crank arm, such as elliptical trainers, stair climbing machines, and the like, and may be used with any device that includes a crank arm and where power measurement or the components of power measurement (e.g. torque, force, RPM) may be desired or otherwise beneficial.

The power measurement device 30 includes a housing 34 secured to an inside portion 38 of the crank arm between a bottom bracket aperture 40 and a pedal aperture 42. Various power measurement electronics are provided within the housing. The inside portion 38 of the crank arm, where the housing 34 is mounted, is that portion adjacent or facing the bicycle frame, drive sprocket, etc. In various possible other implementations, the housing 34 may also be secured to other portions of the crank arm, such as the top, bottom or outside portion. However, securing the housing to the inside portion of the crank arm shields the housing and attendant power measurement components from inadvertent contact with a rider or other obstacle. For example, if a rider's foot were to slip off the pedal, the foot could contact the housing if it was secured to some other portion of the crank arm. However, on the inside of the crank arm, the rider's foot would not contact the housing.

Referring now to FIG. 12-18, the housing 34 includes a mounted portion 44 and a cantilever portion 46. The mounted portion 34 is secured, such as through a pair of bolts 48, to a machined recess 50 in the crank arm. It is also possible to attach the housing 34 to the crank using tape, adhesive or other mechanisms. As discussed further below, one or more strain gauges are mounted to the crank arm within the machined recess 50. The mounted portion 44 defines a male portion with a circumferential flange 52 such that the male portion is dimensioned to fit snugly within the machined recess. A gasket 54 may be provided in a circumferential channel defined in the mounted portion adjacent the crank. When assembled, the gasket is sandwiched between the mounted portion of the housing and the crank arm to block moisture, such as sweat from a rider and water or mud from a trail or road, from entering into the recessed area or into the housing.

The mounted portion further defines a cavity 56 within which are provided a circuit board 58, reed switch 60 (attached to the circuit board) and a port 62 by which electrical components on the circuit board may be accessed or otherwise communicated with to download software or firmware updates as well as to access information. Thus, besides the strain gauge and electrical connections thereto, the various electrical components that process the strain gauge outputs and transmit the data are located within the cavity of the housing. In one particular arrangement, the pair of bolts 48 extend through the mounted housing and are secured to matching threaded apertures 64 defined in the recessed portion of the crank. The printed circuit 58 board extends between and is connected to a pair of molded cylinders 46 through which the bolts 48 pass. The molded cylinders 66 form an integral part of the mounted portion 44 of the housing and extend between an outer wall 68 of the mounted portion and the recess in the crank arm. The cylinders may be dimensioned so that it engages the crank and prevents the housing from being cracked while tightening the bolts.

The power assembly 30 discussed herein may also be adhered, non-mechanically fastened, to any form of existing crank arm without modifying the crank. In such an example, the power assembly housing may or may not include a cantilever portion and will not include a male portion configured to engage a recess. Strain gauges may be adhered directly to a particular crank wall, without physical modification of the side wall. Some surface preparation (cleaning, etc.) may be required before adhering the strain gauges to the crank wall, however. A lower surface of the power assembly housing will define an opening suitable to cover the strain gauges and receive leads connected to the strain gauges. Given the vast number of possible crank arms to which the assembly might be adhered, it is possible that the lower surface and/or wall engaging the crank arm surface, may be contoured to match the crank arm wall contour of a given crank arm. Alternatively, a plurality of different adapters may be fabricated so that a common power assembly housing may mate to different crank arms. In such a configuration, and adapter may have a first side that has a matching contour of a given crank arm, and a second side that has a matching contour of the common power assembly housing. The housing in any given configuration includes the processor, batteries, and wireless transmission capability. Accordingly, the system may be mated to any of a variety of existing crank arms without modification of the crank arm (e.g., without tapping the crank arm to accept bolts which could effect the structural integrity of the crank), and the power assembly will wireless transmit a power value that may be used to display the power being exerted while riding and/or exercising on a device including the crank. With such a system, there is no need to purchase or replace existing drive train components. Rather, a rider may simply retrofit or purchase a crank arm (with power assembly) for his or her existing drive train.

Figure 15:
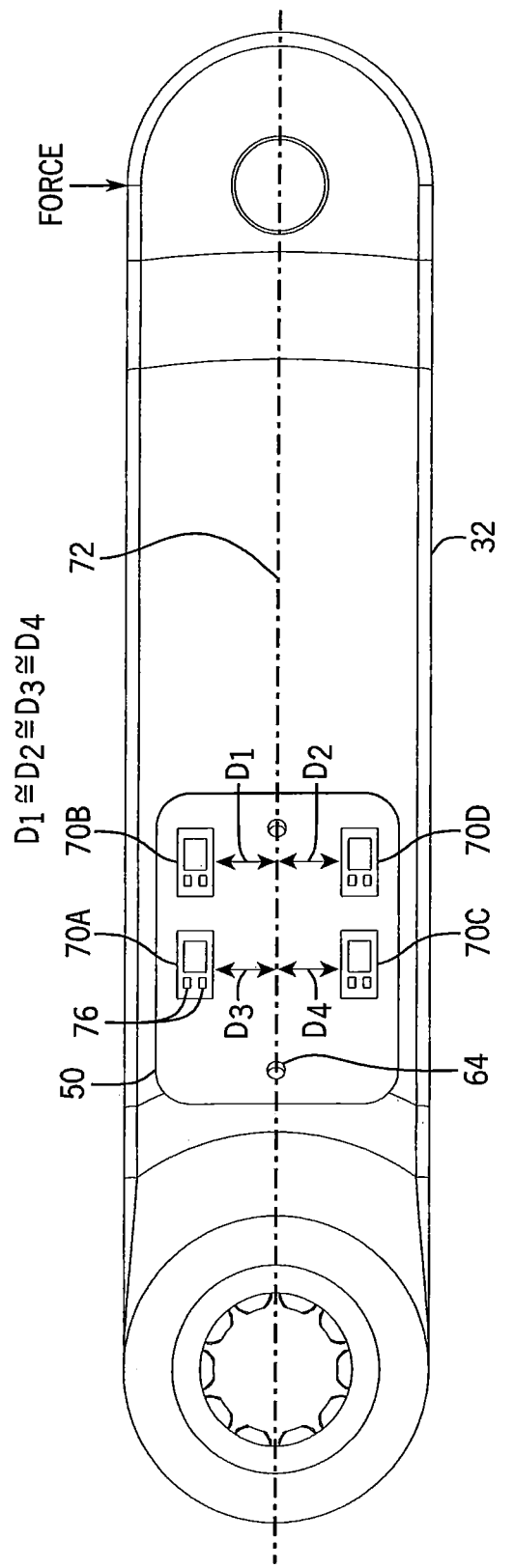
FIG. 15 is a right side view of the crank arm as shown in FIG. 14 and providing further detail as to the arrangement of the strain gauges within the recess of the crank arm.
Figure 16:
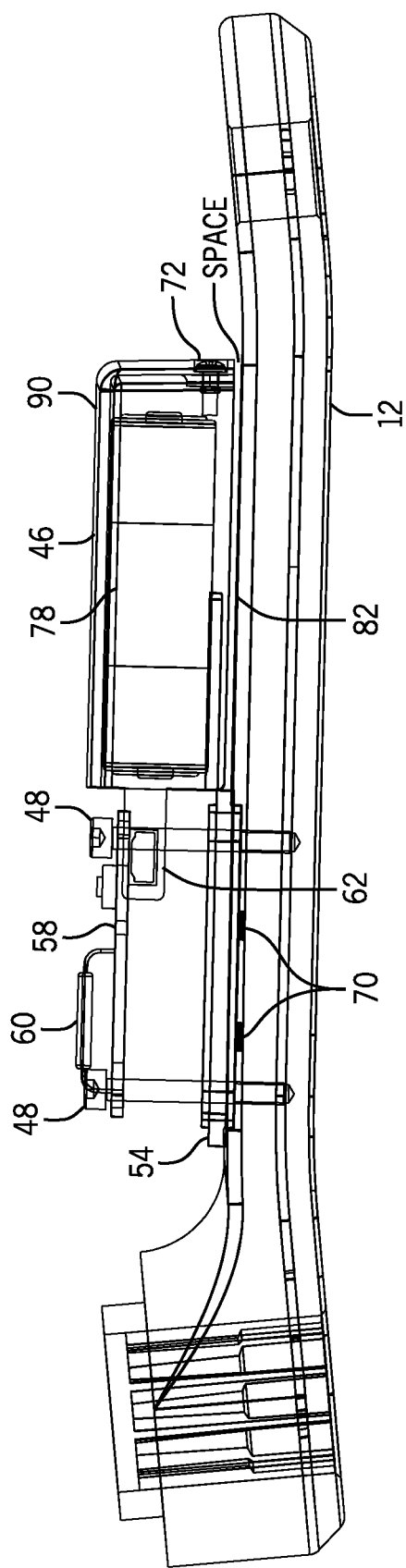
FIG. 16 is a top view of the crank arm and power measurement device with various components hidden to illustrate internal components.
Figure 17:
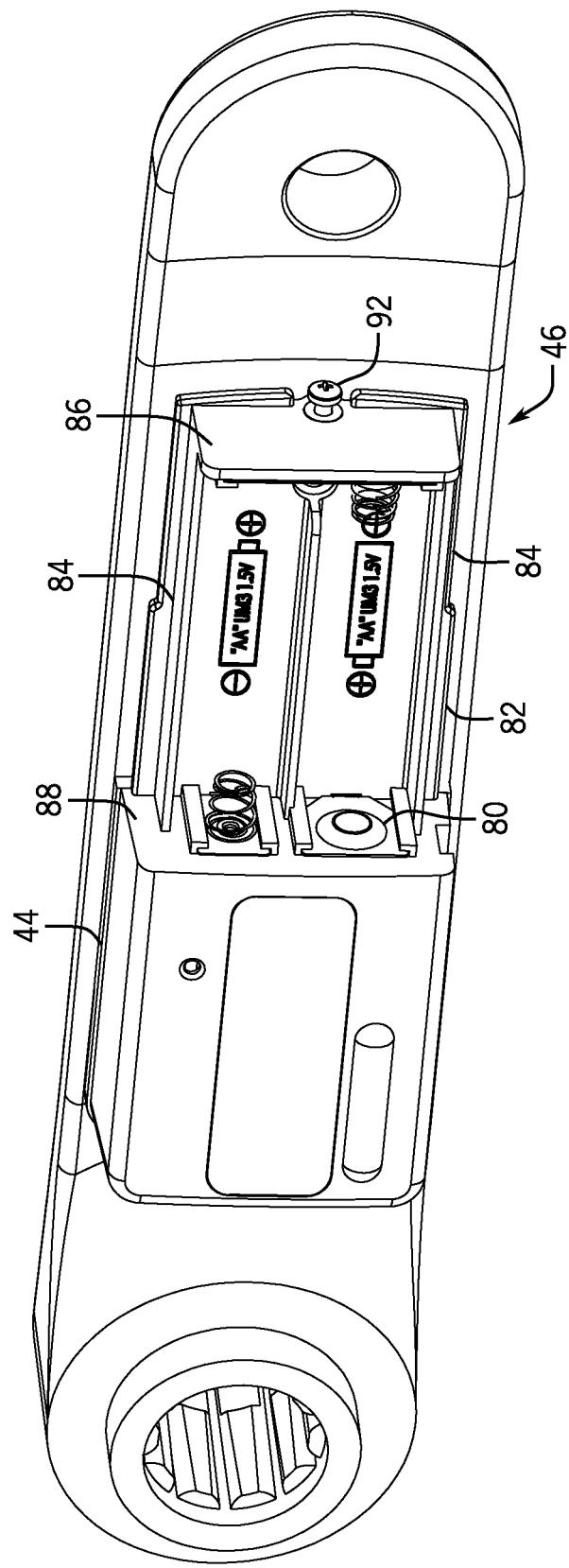
FIG. 17 is an isometric view of the crank arm and power measurement apparatus with the cover of the cantilevered portion of the housing removed.
Figure 18:
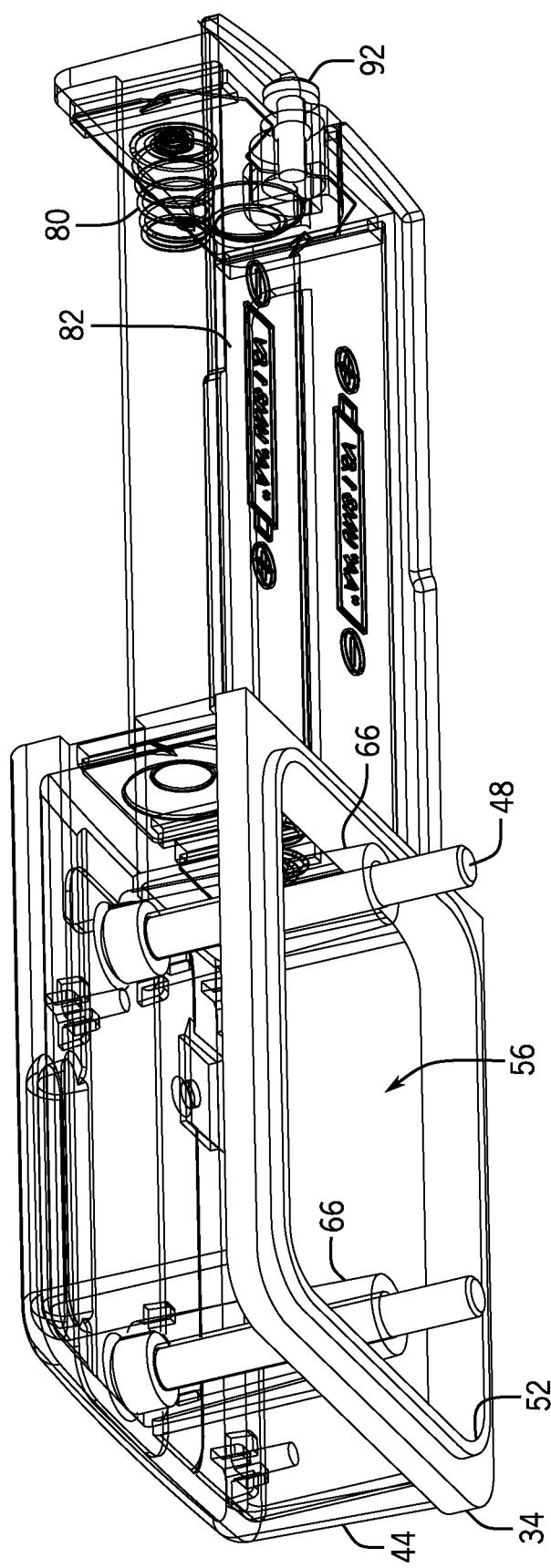
FIG. 18 is an isometric view of the power measurement apparatus with various components hidden.

As shown in FIGS. 15, 16 and others, within the recessed portion 50 of the crank arm, one or more strain gauges 70 may be provided. In the implementation shown, two pair of strain gauges are shown with one member of each pair disposed equidistant from a centerline 72 of the crank arm to an opposing pair. The strain gauges are placed on the inside wall of the crank arm. In one particular implementation, the strain gauges are glued to a smooth flat surface of the crank. While a machined or otherwise provided recess is shown, the power measurement apparatus may be applied to an existing crank arm with little or no preprocessing of the crank arm. The machined recess 50 is provided with a smooth flat bottom upon which the strain gauges are secured. To assist with consistency between crank assemblies, a template may be used to apply the strain gauges to the crank surface within the machined recess. Alternatively, the strain gauge may be pre-mounted on a substrate in a desired configuration, and the substrate mounted to the crank. The side walls of the machined recess also provide a convenient way to locate the housing.

In the implementation shown, the strain gauges 70 are placed relatively closer to where the crank is mounted 40 at the bottom bracket 65 compared to where torque is applied to the crank arm at the pedal 74. As such, with the strain gauges 70 placed relatively closer to the pivot point of the crank arm (i.e., the bending point of the theoretical beam), there is greater strain gauge output resolution providing a larger output voltage of the Wheatstone bridge circuit, discussed herein, compared to having the strain gauges been placed relatively closer to the pedal point given the same torque. With greater resolution, the output voltage is large relative to noise and other spurious voltage outputs; therefore, the circuit requires relatively less filtering, amplification and the like to accurately extract the voltage reading of the circuit.

As shown, the strain gauges 70 may be placed on the same wall of the crank arm and are arranged in the same relative direction. In one particular example, the strain gauges are each parallel to the other gauges. Stated differently, each strain gauge defines a longitudinal axis across which the strain gauge is response to tension or compression. Each of the strain gauges is arranged such that the longitudinal axes are parallel. Hence, in the example of FIG. 15, with the illustrated downward force on the crank, the upper strain gauges (70A and 70B) will be in tension while the lower strain gauges (70C and 70D) will be placed in compression. The arrangement, through its geometry, filters out forces not relevant to measuring power applied to the cranks causing rotation about the bottom bracket. For example, should a transverse force (e.g. normal to plane defined by the 2 pair of gauges) be applied to the pedal, such as if a rider is applying a force that has both downward and non-downward forces on the pedal, then all of the strain gauges will compress or tension in the same way from the transverse force and cause a 0 voltage output of the Wheatstone bridge circuit. Similarly, non-tangential forces applied to the pedal are automatically normalized to a tangential force measurement.

Additionally, the strain gauges are positioned on the same wall or surface of the crank arm 32. In the particular examples set out herein, the strain gauges 70 are each on an inside wall of the crank arm. The inside wall is the wall facing an opposing crank or otherwise the frame of the exercise bicycle when the crank is assembled on the exercise bicycle. The assembly can be positioned on other walls, depending on the configuration. The inside wall, however, provides some protection from inadvertent contact. The inside wall (or opposite outside wall) experiences less deflection during riding as compared to the upper and lower walls (those walls or surfaces connecting the inside and outside walls). Placing the strain gauges on those upper and/or lower walls, would provide greater strain gauge bridge output for the same forces thereby providing potentially higher resolution bridge outputs. Nonetheless, those walls are potentially at risk for much greater inadvertent contact, whether on an indoor bike or outside bike.

Figure 19:
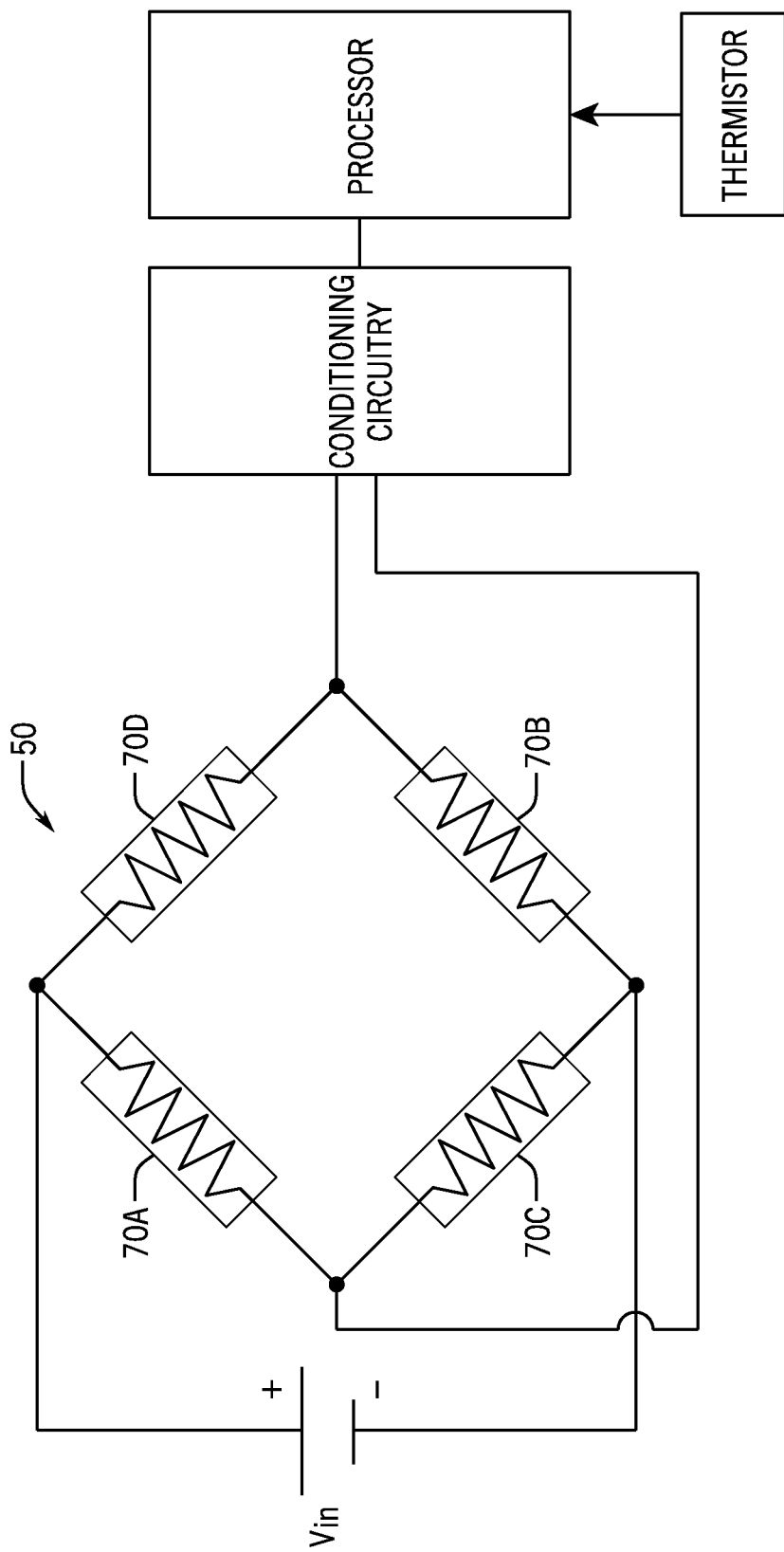
FIG. 19 is a circuit diagram of a Wheatstone bridge circuit and related processing components that may be used to provide a voltage output proportional to the force applied to the crank axle or the crank arm.
Figure 21:
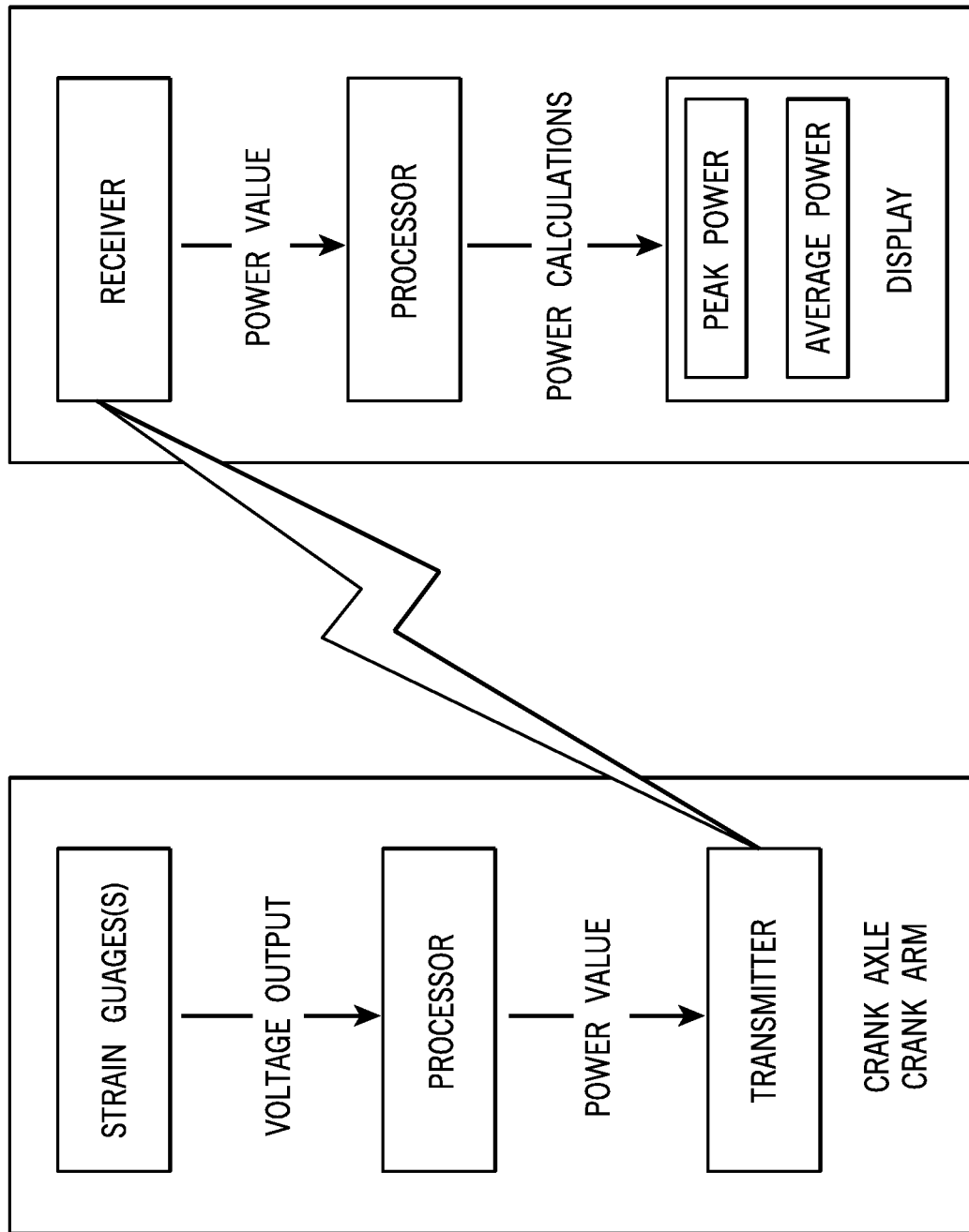
FIG. 21 is system diagram illustrating the electrical components positioned within the crank axle and at the crank arm and within the power measurement housing in wireless communication with a display computer provided separately from the power measurement apparatus.

The strain gauges 70 each include leads 76 connected in a Wheatstone bridge circuit arrangement. For example, as shown in FIG. 19, the strain gauges are connected in the circuit arrangement shown. Other circuit arrangements are possible that use more or less strain gauges, such as a half bridge configuration. With reference to FIG. 21, the strain gauges, processor, and transmitter may be placed in the crank axle or in the crank housing. An input voltage is applied to the bridge circuit and the output voltage of the circuit is proportional to the tangential bending force (torque) applied to the crank arm. The output voltage may be applied to some form of conditioning and amplification circuitry, such as a differential amplifier and filter that will provide an output voltage to the processor. It is further possible to use an analog to digital converter to convert and condition the signal.

Figure 20A:
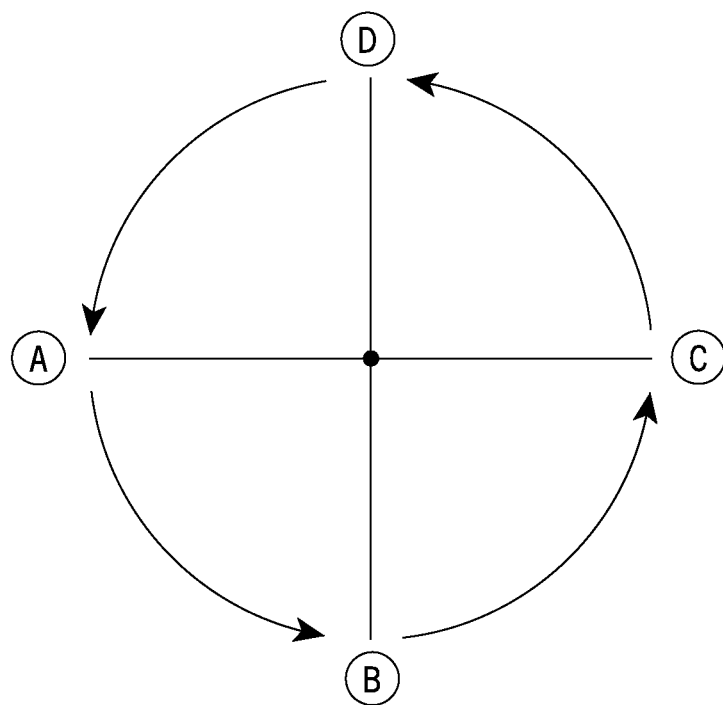
FIG. 20A is a diagram depicting various points in the rotation of a crank arm, the various points corresponding to the output voltage waveform shown in FIG. 20B
Figure 20B:
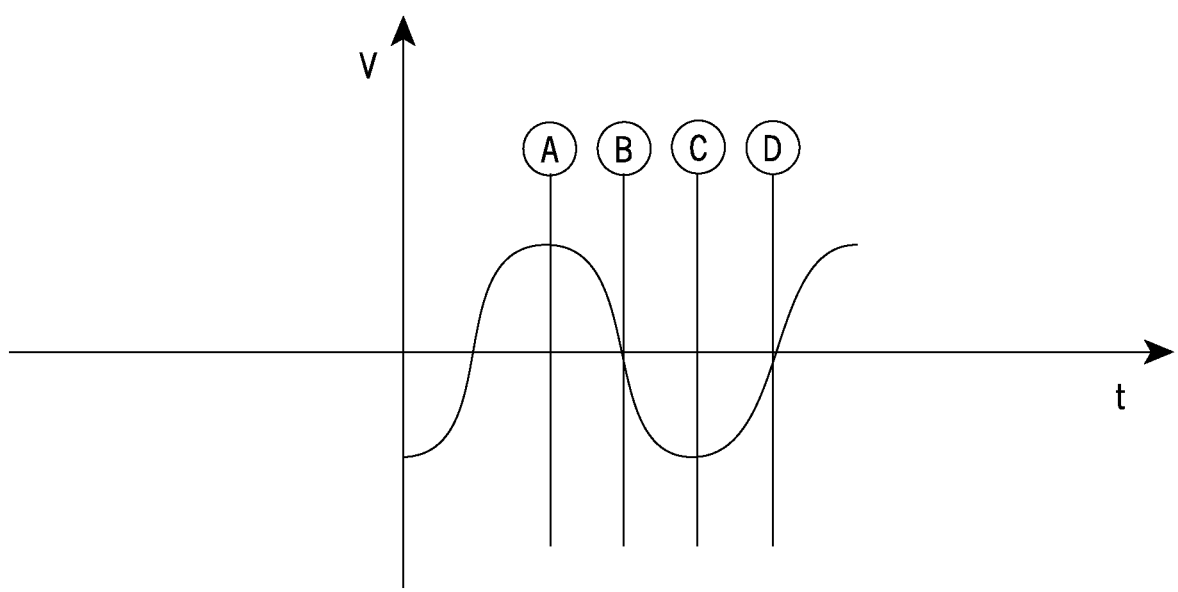
FIG. 20B is an output voltage waveform of the Wheatstone bridge circuit of FIG. 19 for approximately one revolution a crank arm.

With the illustrated strain gauge configuration, the output voltage of the Wheatstone bridge circuit is proportional to the torque applied and also indicative of the direction of rotation and the crank position. As illustrated in FIGS. 20A and 20B, generally speaking, the output of the second Wheatstone bridge will be a sinusoid with the highest output voltage with the crank approximately horizontal and a downward force applied to the crank arm (crank position A, FIG. 20B). As the crank moves through the downward vertical position (crank position B), the voltage will typically be about 0, as the crank moves upward to horizontal (crank position C) the voltage will be slightly negative. Typically the downward force of the opposing crank arm pushes the measured arm up against some weight of the rider's leg (typically riders do not pull upward on the cranks, the opposing leg hence uses some force to push the opposing crank arm upward against the opposing leg), and as the crank moves through the upward vertical position (crank position D) the output voltage will transition from a negative value to a positive value, and reach its peak output again as the crank is rotated through horizontal (crank position A). The first set of strain gauge and first Wheatstone bridge circuit (associated with the crank axle) will generate a similar sinusoid, except it will be about 180 degrees out of phase with the sinusoid of FIGS. 20A and 20B because the cranks are 180 degrees out of phase.

As discussed above, it is possible that power measurement may occur on only one of two crank arms are be associated with only one of two crank arms. In such an arrangement, relative symmetry between the right and left leg of a given rider is assumed and the average power calculated from the power measurement device on one crank is doubled and transmitted to the display processor. As shown in FIG. 21, a separate device may include a wireless receiver, an additional processor and a display. In one example, the power doubling occurs within the power measurement device (within the crank housing or at the crank), by the appropriate processor or otherwise, and the power value wirelessly transmitted by the device includes the doubling. With such an arrangement, the power measurement device may work with a proprietary display device or may work with third party devices that implicitly expect a value that accounts for both legs and has no inherent functionality to double a value. In some examples, the device may wireless transmit the single leg (crank) power value and doubling may occur at the display processor or related display electronics. Alternatively, the display may be configured to sum the power values wireless received, when separate power measurement devices are each mounted on opposing crank arms to provide distinct crank arm power measurements.

Regardless, the power calculations/measurements displayed are indicative of the total power output by a given rider. Measuring power of only one leg, while theoretically not as precise as separate devices for each leg, nonetheless has several advantages. First, retrofitting and maintaining the power measurement device is far less complicated and costly compared to a similar implementation with two devices. So, for example, with respect to the spindle based power measurement, an existing crank set may simply be retrofitted with a power measurement equipped spindle. Secondly, when installed on training equipment, particularly in a gym environment where a given rider may not use the same equipment during successive trips to the gym, the device set out herein may be calibrated such that power measurements across machines is consistent. With such consistency, whether across machines or not, a given rider can measure overall relative riding differences. Of course, it is possible to apply a power measurement device to the spindle and the crank arm of a given machine and provide individual crank arm power measurements as well as a summation of the power measurements. In such an implementation, a rider would be provided with data on each individual leg as well as a total power output indicative of overall power output.

A reed switch 60 is included in the power measurement device and a magnet (not shown) may be placed on the frame of whatever device the crank is attached such that the reed switch closes as it passes the magnet. Thus, the time between two pulses of the reed switch indicate one complete revolution of a crank. Using a microprocessor clock, the pulses can be converted to a revolution per minute measurement.

Figure 22:
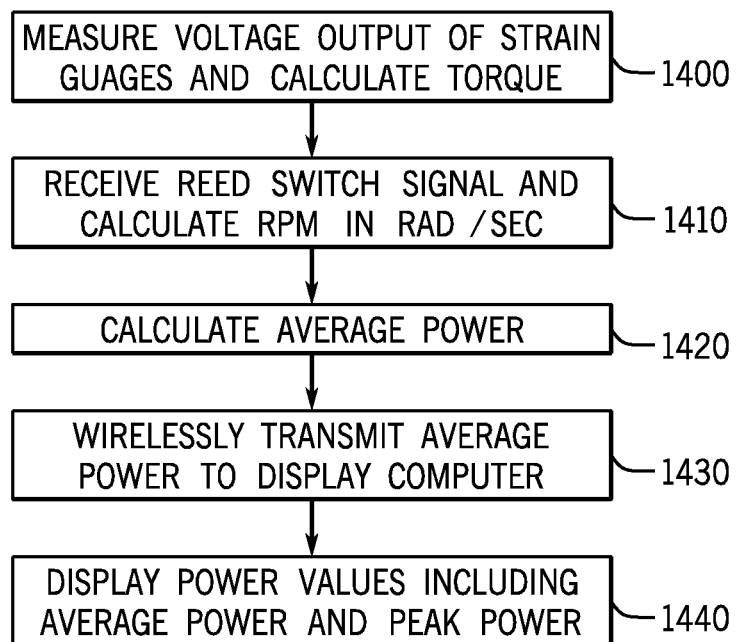
FIG. 22 is a flowchart illustrating one method of calculating and transmitting power measurements from the power measurement apparatus.

"Power" is the most common measurement of a rider's strength. Referring to FIG. 22, in one implementation, the instantaneous torque is measured by the strain gauges with the output voltage of the strain gauges being converted to a power value for display. First, the voltage output of the strain gauges is provided to the processor (operation 1400). With respect to the crank arms, the output of the second circuit is a measure of torque and therefore is converted to power through obtaining a radians/sec value. Similarly, the output of the first circuit (relative to the strain gauges within the axle) is a measure of the torsion on the spindle produced by the crank. Power may be calculated similarly for either value. With specific reference to an example based upon torque value from the crank arms, as mentioned herein, the voltage output may first be converted to a digital value through an analog to digital converter. In on specific implementation, power (watts) is calculated as radians/sec multiplied by the torque value, as follows:

$$\text{Power (Watts)}=\text{Radians/Sec}\times\text{Torque}. \quad (1)$$

The reed switch and/or the accelerometer provide data indicative of each revolution of the crank arms. In conjunction with the processor clock, or otherwise, the processor obtains a revolutions per minute value in radians per second (operation 1410). With a reed switch, a pulse is receive at each revolution of the crank arm, and the pulse to converted to revolutions per minute through comparison with the processor clock. Then, to convert the RPM value to Radians/Sec, a multiplier value of 0.1047 is used, in one particular example, as follows:

$$\text{RPM}\times 0.1047=\text{Rad/Sec}. \quad (2)$$

The strain gauge measurement, in conjunction with the revolution measurements, is converted to an instantaneous power value by as discussed above and multiplying that value by the length of the crank arm between the apertures (operation 1420), as follows:

$$\text{Torque (N*m)}=\text{Force (Newton)}\times\text{Length (meters)}. \quad (3)$$

Hence, with measured torque multiplied by the Rad/Sec value, power is calculated. In one example, power is sampled at 32 Hz, and converted and wirelessly transmitted (operation 1430) to the display using the ANT+ protocol developed by Dynastream Innovations, Inc. While the transmitter is shown as a discrete component within the housing, it is possible that it, along with other electrical components, might be provided in the processor within the axle or the crank housing. Further, the processor may be implemented as an ASIC, as computer executable instructions in a memory attached to the processor, as a customized circuit, etc. Moreover, other protocols and wireless transmission mechanism may be employed. For example, the transmitter may send Bluetooth messages, and in such an arrangement messages may be sent to the processor with the axle or the crank since Bluetooth is bidirectional.

In one possible implementation, the average power is displayed (operation 1440) over a number of samples as opposed to an average across all samples. In this way, large changes in power associated with rapid acceleration, for example, may be captured but rapidly changing fluctuations between power measurements are filtered by the averaging. In one example, a rolling average of the most recent 64 measurements is displayed. Hence, the most recent 64 power measurements are summed and divided by 64 to display average power. Note, the power measurement device transmits instantaneous power measurements at 32 Hz and those measurements are doubled (to account for the opposing crank without a power measurement device). While this combination of transmission frequency and averaging is not necessary, it has been shown to be responsive to instantaneous changes associated with quick acceleration as well as providing a display that is not overly jittery if too few values are averaged. It is also possible to transmit torque values (or voltages) and RPM measurements, and then calculate power within the display counsel.

Returning again to the figures illustrating the housing 14 (e.g., FIGS. 9, 10, and 12) adjacent the mounted portion 44 is a cantilevered portion 46 of the housing. The cantilevered portion 46 extends from the mounted portion 44 along the crank arm body toward the pedal aperture 42. The cantilevered portion 46 houses batteries 78 and connection points to provide power to the electrical components within the mounted portion of the housing. The cantilevered portion defines a substantially flat bottom adjacent, but not touching, the inside portion of the crank arm. Because the crank arm does bend during usage albeit only slightly, cantilevering a portion of the housing provides several advantages. Firstly, by not touching the crank arm, there will not be any squeaks caused by the crank arm moving relative to and rubbing against the cantilevered portion. Secondly, the cantilevered portion is not bolted to the crank arm. Had the cantilevered portion been bolted, the bending distance between the bolts on the mounted portion relative to a bolt on the cantilevered portion could potentially cause the housing to crack, to loosen the bolts, or to damage some internal components.

The cantilevered portion 46 includes a base portion 82 that extends from and is integral to the mounted portion. The base portion 82 includes opposing side walls 84 and a front wall 86 distal a midwall 88 of the mounted portion. Battery contact points 80 are provided at the front wall and the midwall and batteries are positioned therebetween. Wires are connected to the contact points and routed to the circuit board to provide power to the various components coupled thereto. A cover 90 is snap fit to the base portion and may further be secured by a small screw 92 engaging a threaded aperture in the front wall. The embodiment shown includes two AA batteries, which are well suited for a club environment for ease of exchange and long life. It is also possible to use smaller watch style (coin) batteries or other types of power supply.

In an alternative implementation, an accelerometer, which may be a two or three axis accelerometer, may be used alone or in conjunction with the reed switch. An accelerometer may be used to provide both crank position and rpm measurements. Namely, for example, in a two axis accelerometer or a three axis accelerator where two of the three axes are used, one axis may be aligned with the crank arm and the other axis oriented at 90 degrees to the crank arm. Accordingly, one axis will output a value commensurate with the g-force experienced by the crank and the other axis will output a value 90 degrees out of phase with the first. By knowing the axis associated with the crank and whether attached to the left or right crank, the accelerometer, will output a value that is a function of the crank position among other factors. Further by comparing the output of the other axis, it can be determined whether the cranks are being pedaled forward or backward.

In another alternative implementation, a thermistor is operably associated with the processor. Strain gauges, the crank material, and other components are affected by temperature. Accordingly, it is possible that when a power assembly is exposed to significant temperature variations, such as during a ride that commences early in the morning and continues as the outside temperature increases, the power output delivered by the device would vary based on temperature. In such situations, the device may output different power values due to temperature even when the rider is cranking at the same power. So, a rider cranking along at 150 watts in the early morning would have a power reading of 150 watts, and the same rider cranking along at 150 watts after it has warmed up outside may only have a power reading of 100 watts. The thermistor can be used to provide temperature compensation to the power value and thereby reduce or eliminate the temperature effect on the power calculation.

In one particular implementation, the Wheatstone bridge circuit provides its voltage output to an analog-to-digital converter to convert the voltage to a digital value. The thermistor also outputs its voltage to the analog-to-digital converter to convert the voltage to a digital value. These values are then input to the processor. Therefore, the processor receives a digital power value and a digital temperature value.

The processor, which is coupled with a memory and/or includes on-board memory, has a power curve and may also have a temperature curve (for those embodiments including a thermistor). Each curve may be established by measuring the output of the A-to-D converter at two known values (e.g., two known forces on the pedal or two known temperatures). Since the curves are typically straight line curves, two values are sufficient to determine the slope of the curve. For the power curve, an A-to-D value is compared with the power curve to determine the power being applied to the crank. To compensate for temperature, the A-to-D value of the thermistor is used to select a temperature offset value (or compensation value) from the temperature curve to apply to the power value.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A power measurement assembly comprising:
a crank axle;
a crank axle strain gauge mounted on an inner wall of the crank axle;
a first circuit connected to the crank axle strain gauge and configured to provide a first output proportional to a force applied to the crank axle;
a crank arm coupleable to the crank axle and defining a surface between a pedal aperture and a bottom bracket aperture; and
a crank arm strain gauge mounted on the surface between the pedal aperture and a bottom bracket aperture.

2. The power measurement assembly of claim 1 further comprising a first crank arm coupled with the crank axle, wherein the crank arm defining the surface between the pedal aperture and the bottom bracket aperture is a second crank arm and the first output is proportional to a force applied to the first crank arm.

3. The power measurement assembly of claim 1 wherein the crank axle strain gauge includes at least two crank axle strain gauges.

4. The power measurement assembly of claim 3 wherein the at least two crank axle strain gauges comprises four crank axle strain gauges and wherein the first circuit comprises a Wheatstone bridge circuit.

5. The power measurement assembly of claim 1 wherein the crank axle defines a hollow inner portion and wherein the first circuit is mounted within the hollow inner portion, the power measurement assembly further comprising a first processor configured to receive the first output from the first circuit and calculate a first force value.

6. The power measurement assembly of claim 5 further comprising a wireless transmitter in operable communication with the first processor, the wireless transmitter mounted within the hollow inner portion, the wireless transmitter configured to transmit information representative of the first force value.

7. The power measurement assembly of claim 1 further comprising a first processor coupled with the first circuit, wherein:
the crank axle is coupled with a first crank arm,
the first output is proportional to a force applied to the first crank arm,
the crank arm defining the surface between the pedal aperture and the bottom bracket aperture is a second crank arm, and
the crank arm strain gauge includes at least two crank arm strain gauges, the at least two crank arm strain gauges coupled with a second circuit configured to provide a second output proportional to a second force applied to the second crank arm.

8. The power measurement assembly of claim 7 wherein the crank axle defines a hollow inner portion and wherein the first circuit and the second circuit are mounted within the hollow inner portion, the first processor configured to receive the first output from the first circuit and the second output from the second circuit, the first processor configured to calculate a first force value representative of a first force applied to the first crank arm and a second force value representative of a second force applied to the second crank arm.

9. The power measurement assembly of claim 8 further comprising a wireless transmitter in operable communication with the first processor, the wireless transmitter mounted within the hollow inner portion, the wireless transmitter configured to transmit information representative of the first force value and the second force value.

10. The power measurement assembly of claim 7 further comprising a wireless receiver operably coupled with a second processor, the second processor configured to receive a value indicative of revolutions of at least the first crank arm and to calculate a power value based on the revolutions of the first crank arm and a first force value representative of a first force applied to the first crank arm.

11. The power measurement assembly of claim 7, wherein the second circuit is configured to provide the second output to a second processor configured to calculate a second force value, the power measurement assembly further comprising a housing mounted on the second crank arm, the housing including the second circuit and a wireless transmitter configured to receive the second force value and transmit information representative of the second force value.

12. The power measurement assembly of claim 7 wherein:
the second crank arm defines a longitudinal line wherein a first crank arm strain gauge of the at least two crank arm strain gauges is positioned on a first side of the longitudinal line and a second crank arm strain gauge of the at least two crank arm strain gauges is positioned on a second side of the longitudinal line equidistant from the first crank arm strain gauge, the first and second crank arm strain gauges being substantially parallel and on a common wall of the second crank arm.

13. The power measurement assembly of claim 12 wherein the longitudinal line is a centerline, and wherein the common wall is an inside wall of the second crank arm.

14. The power measurement assembly of claim 13 wherein:
the centerline extends between the pedal aperture and the bottom bracket aperture,
the at least two crank arm strain gauges include four crank arm strain gauges with a third crank arm strain gauge of the at least two crank arm strain gauges positioned adjacent the first crank arm strain gauge and on a same side of the centerline as the first crank arm strain gauge, and with a fourth crank arm strain gauge of the at least two crank arm strain gauges positioned adjacent the second crank arm strain gauge and on a same side of the centerline as the second crank arm strain gauge, and
the second circuit is a Wheatstone bridge circuit including the first crank arm strain gauge, the second crank arm strain gauge, the third crank arm strain gauge and the fourth crank arm strain gauge.

15. The power measurement assembly of claim 10 further comprising at least one of a reed switch, an accelerometer, and optical sensor coupled with the second processor to produce a value indicative of crank revolutions used by the second processor to determine the power value.

16. The power measurement assembly of claim 10 further comprising an element providing a value indicative of temperature, the value used to provide a temperature compensated power value.

17. The power measurement assembly of claim 10 further comprising a display processor and associated display that are configured to receive the power value from the second processor, the power value being an instantaneous value that is averaged by the display processor.

18. The power measurement assembly of claim 17 further comprising a thermistor in communication with the second processor, the second processor further configured to adjust the power value to compensate for temperature effects, and wherein the display shows a temperature compensated and doubled power value.

19. A power measurement device comprising:
a crank axle including a tubular inner wall and defining a hollow inner portion, the crank axle supporting at least one crank axle strain gauge on the tubular inner wall, the hollow inner portion further including a first circuit connected to the at least one crank axle strain gauge and configured to provide a first output proportional to a force applied to the crank axle, the first circuit coupled with a processor configured to receive the first output from the first circuit and to calculate a first force value, the hollow inner portion further comprising a wireless transmitter in operable communication with the processor, the wireless transmitter configured to transmit information representative of the first force value; and
a crank arm defining a surface between a pedal aperture and a bottom bracket aperture, the surface supporting at least one crank arm strain gauge, the crank arm further including a second circuit connected to the at least one crank arm strain gauge and configured to provide a second output proportional to a force applied to the crank arm.

20. The power measurement device of claim 19 wherein: the at least one crank axle strain gauge comprises four crank axle strain gauges; and the first circuit comprises a Wheatstone bridge circuit.

21. The power measurement assembly of claim 1, wherein the crank axle strain gauge is operatively coupled with a printed circuit board and the printed circuit board is mounted on the tubular inner wall.

22. The power measurement assembly of claim 1, wherein the crank arm strain gauge is operatively coupled with a printed circuit board and the printed circuit board is mounted on the surface between the pedal aperture and the bottom bracket aperture.

23. The power measurement device of claim 19, wherein the crank axle strain gauge is operatively coupled with a printed circuit board and the printed circuit board is mounted on the tubular inner wall.

24. The power measurement device of claim 19, wherein the crank arm strain gauge is operatively coupled with a printed circuit board and the printed circuit board is mounted on the surface between the pedal aperture and the bottom bracket aperture.

\* \* \* \* \*